United States Patent
Zhu et al.

(10) Patent No.: US 10,582,017 B2
(45) Date of Patent: Mar. 3, 2020

(54) TECHNIQUES TO PROVIDE WIRELESS STORAGE AND PROCESSING CAPABILITIES

(71) Applicant: INTEL CORPORATION, Santa Clara, CA (US)

(72) Inventors: Jiangfang Olena Zhu, Hillsboro, OR (US); Ana Yepes, Hillsboro, OR (US); Sayan Lahiri, Hillsboro, OR (US); Bo Qui, Hillsboro, OR (US); Kevin Daniel, Tigard, OR (US); Guodong Zhang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/778,314

(22) PCT Filed: Dec. 24, 2015

(86) PCT No.: PCT/US2015/000442
§ 371 (c)(1),
(2) Date: May 23, 2018

(87) PCT Pub. No.: WO2017/111858
PCT Pub. Date: Jun. 29, 2017

(65) Prior Publication Data
US 2018/0343324 A1 Nov. 29, 2018

(51) Int. Cl.
*H04W 4/00* (2018.01)
*H04L 29/06* (2006.01)
*G06F 13/38* (2006.01)
*H04W 72/12* (2009.01)
*H04W 72/04* (2009.01)

(52) U.S. Cl.
CPC ............ *H04L 69/08* (2013.01); *G06F 13/385* (2013.01); *H04L 69/18* (2013.01); *H04W 72/1278* (2013.01); *H04W 72/0446* (2013.01)

(58) Field of Classification Search
CPC ....................................................... H04L 69/08
See application file for complete search history.

(56) References Cited

U.S. PATENT DOCUMENTS

| | | | | |
|---|---|---|---|---|
| 2010/0246119 A1* | 9/2010 | Collopy | ................ | G06F 1/1616 361/679.55 |
| 2012/0162401 A1* | 6/2012 | Melder | .................. | H04N 7/183 348/65 |
| 2013/0145052 A1* | 6/2013 | Aiken | ................... | G06F 9/4411 710/9 |
| 2013/0163489 A1* | 6/2013 | Lee | ......................... | H04W 4/18 370/310 |

(Continued)

OTHER PUBLICATIONS

International Search Report received for PCT Patent Application No. PCT/US2015/000442, dated Aug. 24, 2016, 3 pages.

(Continued)

*Primary Examiner* — Gerald A Smarth

(57) ABSTRACT

Embodiments may be generally directed to techniques to utilize a protocol adaption layer (PAL) extension based on the bus protocol to enable a wireless transfer of data between a persistent storage device and a remote device and communicate, via a transceiver, the data as radio-frequency (RF) signals between the persistent storage device and the remote device utilizing the PAL extension.

25 Claims, 21 Drawing Sheets

*100*

(56) References Cited

U.S. PATENT DOCUMENTS

| | | |
|---|---|---|
| 2013/0268621 A1 | 10/2013 | Mese et al. |
| 2014/0140197 A1 | 5/2014 | Sadeghi et al. |
| 2014/0143436 A1 | 5/2014 | Sadeghi et al. |
| 2014/0364209 A1* | 12/2014 | Perry .................. G06F 3/013 463/31 |
| 2016/0054928 A1* | 2/2016 | Chun .................. G06F 3/0607 711/2 |
| 2016/0128079 A1* | 5/2016 | Verma .................. H04W 72/10 370/329 |

OTHER PUBLICATIONS

Report ITU-R M.2227-1, "Multiple Gigabit Wireless Systems in frequencies around 60 GHz," Nov. 2011, 28 pages.

* cited by examiner

500

```
UTILIZE, BY A PROCESSING UNIT, A
PROTOCOL ADAPTION LAYER (PAL)
EXTENSION BASED ON THE BUS PROTOCOL
TO ENABLE A WIRELESS TRANSFER OF DATA
BETWEEN A PERSISTENT STORAGE DEVICE
AND A REMOTE DEVICE
505
```

```
COMMUNICATE, VIA A TRANSCEIVER, THE
DATA AS RADIO-FREQUENCY (RF) SIGNALS
BETWEEN THE PERSISTENT STORAGE
DEVICE AND THE REMOTE DEVICE
UTILIZING THE PAL EXTENSION
510
```

*FIG. 5*

TECHNIQUES TO PROVIDE WIRELESS STORAGE AND PROCESSING CAPABILITIES

CROSS-REFERENCE TO RELATED APPLICATION CASE

This application is a national phase claiming the benefit of and priority to International Patent Application No. PCT/US2015/000442, filed Dec. 24, 2015, entitled "TECHNIQUES TO PROVIDE WIRELESS STORAGE AND PROCESSING CAPABILITIES", which are hereby incorporated by reference in their entirety.

TECHNICAL FIELD

Embodiments described herein generally relate to storing, providing, and processing data on a wireless storage device.

BACKGROUND

Computing devices having wireless capabilities may communicatively couple to other devices having wireless capabilities via a wireless local area network (WLAN) using wireless technologies such as Wi-Fi® or directly utilizing peer-to-peer and ad-hoc networking techniques. These computing devices may utilize wireless technologies designed to operate in a 60 GHz frequency band in accordance with one or more wireless communication standards, such as Institute of Electrical and Electronics Engineers (IEEE) 802.11ad-2012 published on Dec. 28, 2012, or any variant thereof (hereinafter "the IEEE 802.11ad Standard"). Operating in the 60 GHz frequency band may allow wireless capable devices to replace wired interconnects with high speed and relatively short range wireless connections. Moreover, these wireless interconnects may enable high performance wireless data transfer for display applications, audio applications, and so forth that supplement capabilities of current wired devices.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates an example logic flow diagram.

DETAILED DESCRIPTION

Figure 1A:
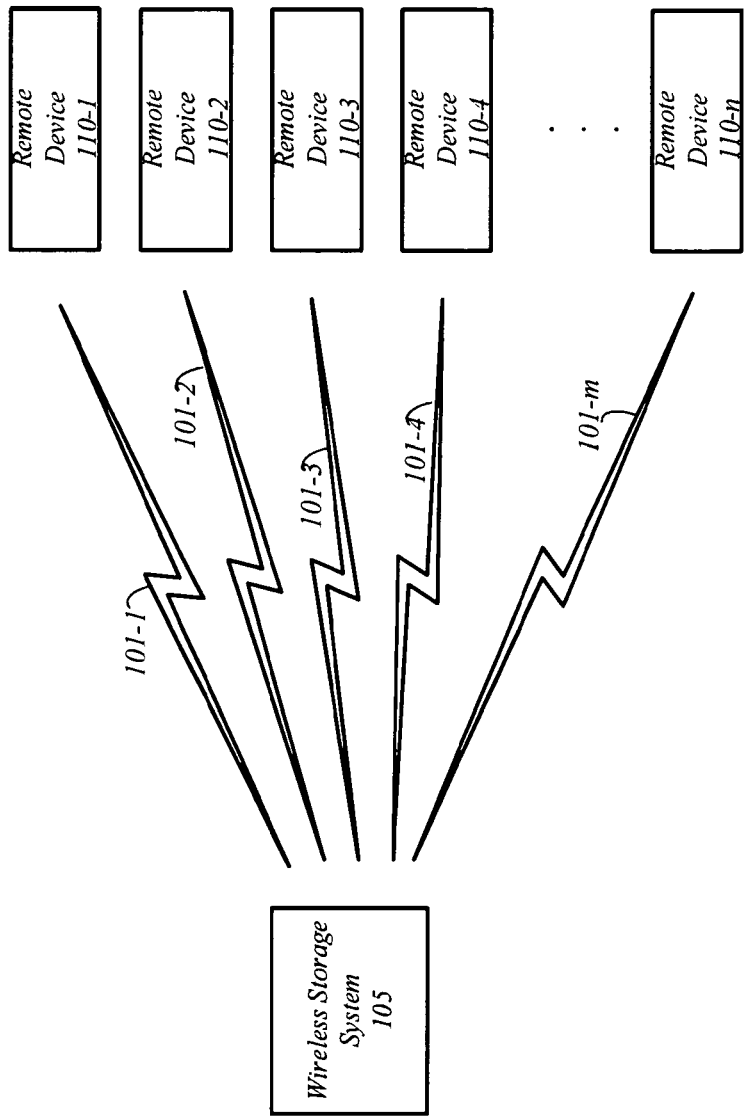
FIG. 1A-1E illustrate examples of a compute system.

Various embodiments are generally related to one or more methods, techniques and systems to process data in a wireless storage system. For example, embodiments may include a wireless storage system having circuitry, memory, and a transceiver to enable wireless communication in accordance with the IEEE 802.11ad standard or a variant thereof. The wireless storage system may also include a persistent storage device to store data and information capable of being wirelessly communicated to and from another device. For example, data such as video data may be stored on the wireless storage system in the persistent storage device. The video data may be wireless communicated to another, remote device for presenting on a display.

In various embodiments, the wireless storage system may utilize one or more protocol application layer (PAL) extensions to enable a wireless transfer of data between the wireless storage system including the persistent storage device and a remote device. For example, a PAL extension such as a wireless bus extension (WBE) may be used to wirelessly send and receive data communicated via universal serial bus (USB) interfaces and buses. In another example, a wireless serial extension (WSE) may be used to wirelessly send and receive data communicated via peripheral component interconnect express (PCIe) interfaces and buses. Embodiments are not limited in this manner.

In various embodiments, the PAL extensions may enable wirelessly communicating data at speeds of approximately 7 Gigabits/second using multi-carrier mode and 4.6 Gigabits/second using single carrier mode in the 60 GHz frequency band. These data rates may enable communication of data, such as high-definition (HD) video data, ultra-HD (UHD) video data, HD image data, UHD image data, HD map data, UHD map data, and so forth. For example, one or embodiments may include streaming UHD video data from the wireless storage system to a device for presentation on a display. In another example, the wireless storage system may include sending and receiving map data for presentation on a display of an infotainment system. In a third example, embodiments may include communicating UHD medical image data between the wireless storage system and a medical imaging device. Embodiments are not limited to this examples and include other use case scenarios as described herein.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a general overview of a compute system 100 including a wireless storage system 105 communicatively coupled with one or more remote devices 110-n, where n may be any positive integer greater than zero. The wireless storage system 105 may be communicatively coupled with the remote devices 110 via one or more wireless connections 101-m, where m may be any positive integer. In some embodiments, the wireless storage system 105 may communicate with the remote devices 110 in the 60 GHz frequency band in accordance with one or more wireless specifications and standards, such as Institute of Electrical and Electronics Engineers (IEEE) 802.11ad-2012 published on Dec. 28, 2012, or any variant thereof (hereinafter "IEEE 802.11ad Standard"). By utilizing the 60 GHz frequency band, the wireless storage system 105 may be capable of communicating large amounts of data at high data rates, as will be discussed in more detail below.

In embodiments, the wireless storage system 105 may store and provide any type of data for the remote devices 110. The data may include multimedia data, media data, video data, picture data, map data, medical image data, advertisement data, or any other type of data. Further, the remote devices 110 may be any type of device such as a television, a high definition (HD) television, an 4k Ultra-HD television, a video display device, a camera, a virtual reality device, an infotainment device, a vehicle infotainment device, a kiosk device, a medical image device, a shopping system, a point-of-sale system, a telephone, a cellular telephone, a video phone, a smart telephone, a personal digital assistant, or any other compute device. Moreover, the remote device 110 may be a wearable device, such as a smart watch, an activity tracker, a pair of smart glasses, smart clothing, a smart shirt, and so forth. Embodiments are not limited to these examples.

As will be discussed in more detail below, the wireless storage system 105 may include processing circuitry, memory, a transceiver, and a battery to provide wireless storage capabilities while operating on battery power. Further, the wireless storage system 105 may implement one or more protocols to enable high speed data transfers between the wireless storage system 105 and remote devices 110 over wireless connection 101. These protocols may include Protocol Adaptation Layer (PAL) extensions including a wireless serial extension (WSE) and a wireless bus extension (WBE). Further, the high speed data transfer rates may be in the gigabit data transfer rate range. For example, embodiments may include wirelessly communicating data at speeds of approximately 7 Gigabits/second using multi-carrier mode and 4.6 Gigabits/second using single carrier mode in the 60 GHz frequency band. However, embodiments may not be limited in this manner and higher data transfer rates may be realized.

Figure 1B:
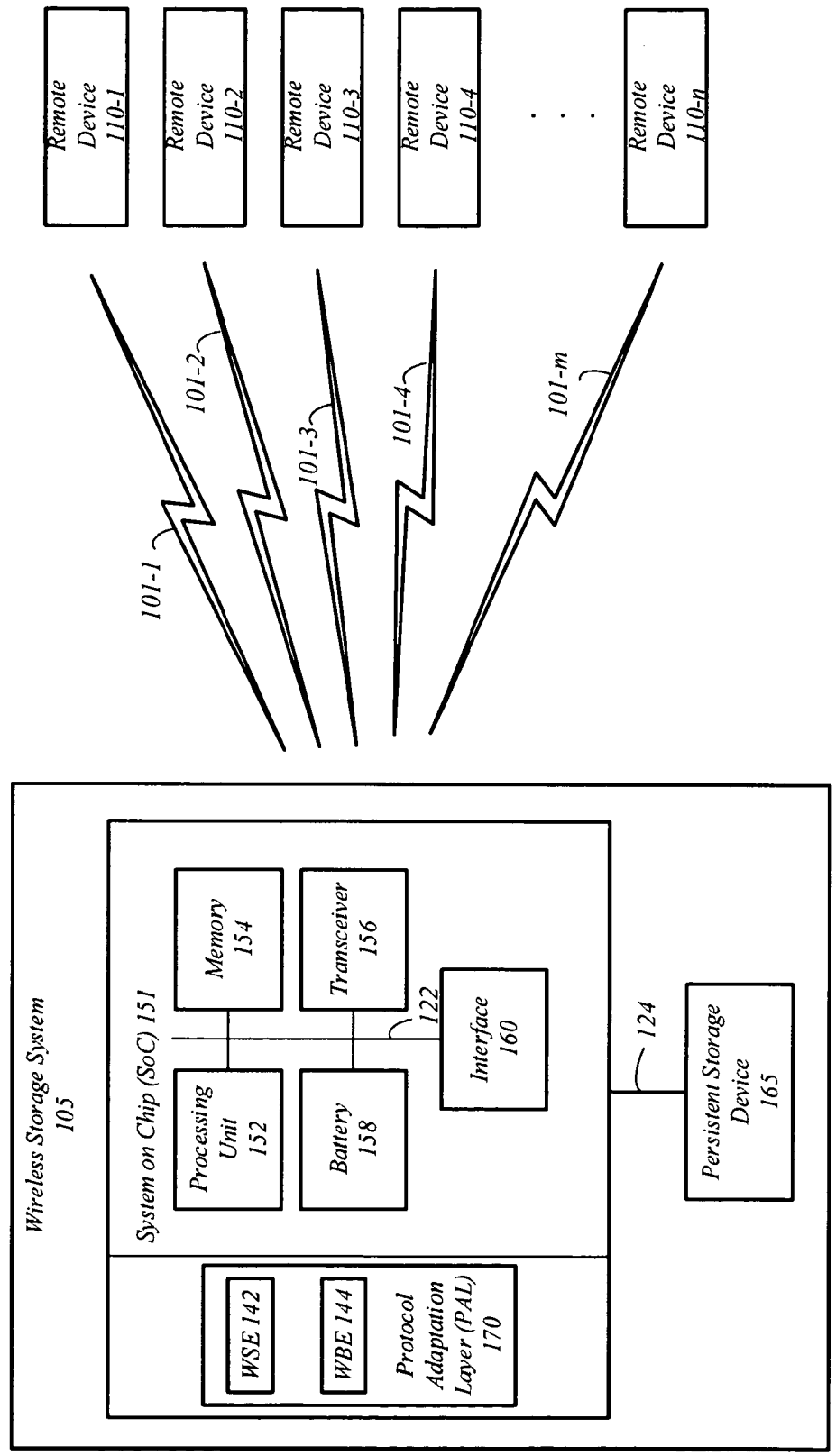

FIG. 1B illustrates a second example of a compute system 120 showing a configuration of the wireless storage system 105. In the illustrated embodiment, the wireless storage system 105 has a system on chip (SoC) 151 which includes a processing unit 152, a memory 154, a transceiver 156, a battery 158, and an interface 160 all coupled via an interconnect 122. The interconnect 122 may include one or more buses, traces, connectors, control lines, and data lines. In some instances, the battery 158 may not be part of the SoC 151, but may be separate and coupled with the SoC 151 by an interconnect. The wireless storage system 105 also includes a persistent storage device 165 which may be coupled with the SoC 151 via a bus 124 which may be a Peripheral Component Interconnect Express (PCIe) bus, a universal serial bus (USB), or combination thereof. Embodiments are not limited in this manner and other types of buses may be contemplated.

The processing unit 152 can include one or more of any type of computational element, such as but not limited to, a microprocessor, a processor, central processing unit, digital signal processing unit, dual core processor, mobile device processor, desktop processor, single core processor, complex instruction set computing (CISC) microprocessor, a reduced instruction set (RISC) microprocessor, a very long instruction word (VLIW) microprocessor, or any other type of processor or processing circuit on a single chip or integrated circuit. The processor unit 152 may be connected to and communicate with the other elements of the wireless storage system 105 via interconnect 122. In some embodiments, the processor unit 152 may include processor registers or a small amount of storage available the processing units to store information including instructions that and can be accessed during execution. Moreover, processor registers are normally at the top of the memory hierarchy, and provide the fastest way to access data. These processor registers may be utilized to process information and data elements described herein.

In embodiments, the wireless storage system 105 may include the memory 154 to store information. Further, the memory 154 may be implemented using any machine-readable or computer-readable media capable of storing data. In some embodiments, the machine-readable or computer-readable medium may include a non-transitory medium. The embodiments are not limited in this context. The memory 154 may be a secure memory or have a portion dedicated as secure.

In embodiments, the memory 154 can store data momentarily or temporarily until power is interrupted. The memory 154 stores instructions and data for wireless storage system 105. The memory 154 may also store temporary variables or other intermediate information while the processing unit 102 is executing instructions. In some embodiments, information and data may be loaded from memory 154 into the computing registers during processing of instructions by processing unit 102. Manipulated data is then often stored back in memory 154, either by the same instruction or a subsequent one. The memory 154 is not limited to storing the above discussed data; the memory 154 may store any type of data.

In some embodiments, the wireless storage system 105 includes a transceiver 156 which includes one or more components and circuitry to transmit and receive information using radio-frequency signals. More specifically, the transceiver 156 may include circuitry to produce radio-frequency mobile radio signals which are to be sent and for processing radio-frequency mobile radio signals which have been received. To this end, the transceiver 156 may be coupled to one or more antennas (not shown). The transmitted or received mobile radio signals are in one or more particular frequency ranges, which are typically prescribed by the mobile radio standard(s) supported by the radio-frequency assemblies. The transceiver 156 can include circuitry to process information according to one or more IEEE standards, one or more peer-to-peer protocols, and so forth. For example, the transceiver 156 may be capable of communicating data in the 60 GHz frequency range in accordance with IEEE 802.11ad.

In various embodiments, the wireless storage system 105 includes the transceiver 156 which may be used to communicate data with remote devices 110. The transceiver 156 may send and receive data from the wireless storage system 105 as one or more packets, frames, and any other transmission structure in accordance with one or more protocols.

The wireless storage system 105 may also include a battery 158 which may be any type of power supply. More specifically, the battery 158 may be a device having two or more electrochemical cells that convert stored chemical energy into electrical energy. The battery may include a Zinc-Carbon battery, a Zinc-chloride battery, an Alkaline battery, a Nickel oxyhydroxide battery, a Lithium battery, a Lithium ion battery, a NiCd battery, a Lead-acid battery, a NiMH battery, a NiZn battery, a AgZn battery, and so forth. Embodiments are not limited to these examples. Other battery types may be utilized, such as phase change materials to store thermal energy which may be converted to electrical energy to power the wireless storage system 105. More specifically, embodiments may include a wireless storage system 105 having a housing defining a cavity to store phase change material. The phase change material may absorb thermal energy from an "outside" source, e.g. one that is not within the housing or an "inside" source, e.g. the processing unit 152 and other components. In this example, the wireless storage system 105 may include a thermoelectric convertor (not shown) to convert the thermal energy to electrically power other components.

The wireless storage system 105 also includes an interface 160 which may be any device having circuitry for processing information and to enable communicating over one or more buses, traces, connectors, data paths, bridges, and so forth. In some embodiments, the interface 160 may be a bus interface that may operate in accordance with a bus protocol. For example, the interface 160 may include a Universal Serial Bus (USB) port coupled with the persistent storage device 165 and operate in accordance with a USB bus protocol. In another example, the interface 160 may include a PCIe port coupled with the persistent storage device 165 and operate in accordance with a PCIe bus protocol. Embodiments may include more than one interface 160 and are not limited in this manner. Further, embodiments are not limited to the above examples and the interface 160 may include IEEE 1394 Firewire ports, Serial ports, parallel ports, a printer port, Centronics ports, PS/2 port, a VGA port, a DVI port, an HDMI port, audio port, MIDI port, RG-6 port, a DisplayPort® port, a Gigabit Ethernet port, a hot pluggable storage port, and so forth.

As mentioned, the wireless storage system 105 may include a persistent storage device 165 coupled with the SoC 151 via interconnect 124 and interface 160. The persistent storage device 165 may be any data storage device that is capable of retaining data after power is shut off. For example, the persistent storage device 165 may include a hard disk drive, a solid-state drive, flash-based memory, magnetic disk, magnetic tape, and so forth. The persistent storage device 165 may store data in various formats including a file format, a block format, an object format, and so forth.

In embodiments, the persistent storage device 165 may provide and store data for the one or more remote devices 110. For example, the wireless storage device 105 may receive data from a remote device 110 via a wireless connection 101 and transceiver 156. The data may be converted into a format for storage in the persistent storage device 165 by the processing unit 152 utilizing a PAL 170 extension. The data may be written to the persistent storage device 165 by the processing unit 152. Similarly, data may be read from the persistent storage device 165, converted into a format for communication to a remote device 110 by the processing unit 152 utilizing a PAL 170 extension, and communicated to the remote device 110 via the transceiver 156 over a wireless communication link 101. The data may be read from and written to the persistent storage device 165 as one or more files, blocks, objects, and so forth based on the type and/or configuration of persistent storage device 165.

The PAL 170 may include extensions such as a WSE 142 and a WBE 144. The PAL 170 extensions may be a set of protocols defined by the WiGig Alliance® (WGA) group which has been subsumed by the Wi-Fi Alliance® group. The protocols standardize the method of transporting traffic of specific industry-standard protocols, e.g. USB using WSE 142 and PCIe using WBE 144, over the 60 GHz enabled media access control (MAC) layer and frequency band. The WSE 142 may operate in accordance with the "Media Agonistic Universal Serial Bus Specification," Release 1.0, published on Mar. 18, 2014, or any variant thereof (hereinafter "Media Agonistic USB Standard"). The WBE 144 may operate in accordance with the "Wi-Fi Alliance WiGig Wireless Bus Extension Technical Specification," Version 1.2, published in 2014, or any variant thereof (hereinafter "Wi-Fi Alliance WiGig WBE Standard").

The wireless storage system 105 may utilize the PAL 170 extensions to enable wireless communication of data with remote devices 110. These PAL 170 extensions may be operable as a translator to convert data between two different formats, such as a USB format or a PCIe format and a wireless format. For example, the WSE 142 may enable wireless communication of data communicated over a USB interface and bus. More specifically, the persistent storage device 165 may send data over a USB interface and bus which may be converted into one or more packets by the WSE 142 at the MAC and PHY layers for wireless communication to a remote device 110 via a wireless connection 101. The data communicated to the remote device 110 may be communicated using a wireless protocol. The remote device 110 may receive the one or more packets and convert them back the data to a USB format for communication over a USB interface and bus. The wireless storage system 105 may also receive one or more wireless packets including data. The received packets may be converted at the MAC and PHY layers to a USB format, in this example, for communication over a USB interface and bus.

In another example, the WBE 144 may enable wireless communication of data communicated over a PCIe interface and bus. More specifically, the persistent storage device 165 may send data over a PCIe interface and bus which may be converted into one or more packets by the WBE 144 at the MAC and PHY layers for wireless communication to a remote device 110 via a wireless connection 101 using a wireless communication protocol. The remote device 110 may receive the one or more packets and convert the packets back to the data formatted for communication over a PCIe interface and bus. The wireless storage system 105 may also receive one or more wireless packets including data. The received packets may be converted at the MAC and PHY layers to a PCIe format, in this example, for communication over a PCIe interface and bus. Embodiments are not limited in this manner. Further, the PAL 170 including the WSE 142 and the WBE 144 may be implemented in hardware only, software only, or a combination of hardware and software.

FIG. 1B illustrates the PAL 170 having both the WSE 142 and the WBE 144 extensions. However, embodiments are not limited in this manner and the PAL 170 may only have extensions based on the interface type of interface 160 coupled with the persistent storage device 165. For example, if the interface 160 is a USB interface, the wireless storage system 105 and processing unit 152 may utilize the WSE 142 and the WBE 144 may not be needed or implemented on the wireless storage system 105. In another example, if the interface 160 is a PCIe interface, the wireless storage system 105 and processing unit 152 may utilize the WBE 144 and the WSE 142 may not be needed or implemented on the wireless storage system 105. By limiting the wireless storage device 105 to components only required to enable wireless storage capabilities, power usage may be reduced extending the battery life of the battery 158.

Figure 1C:
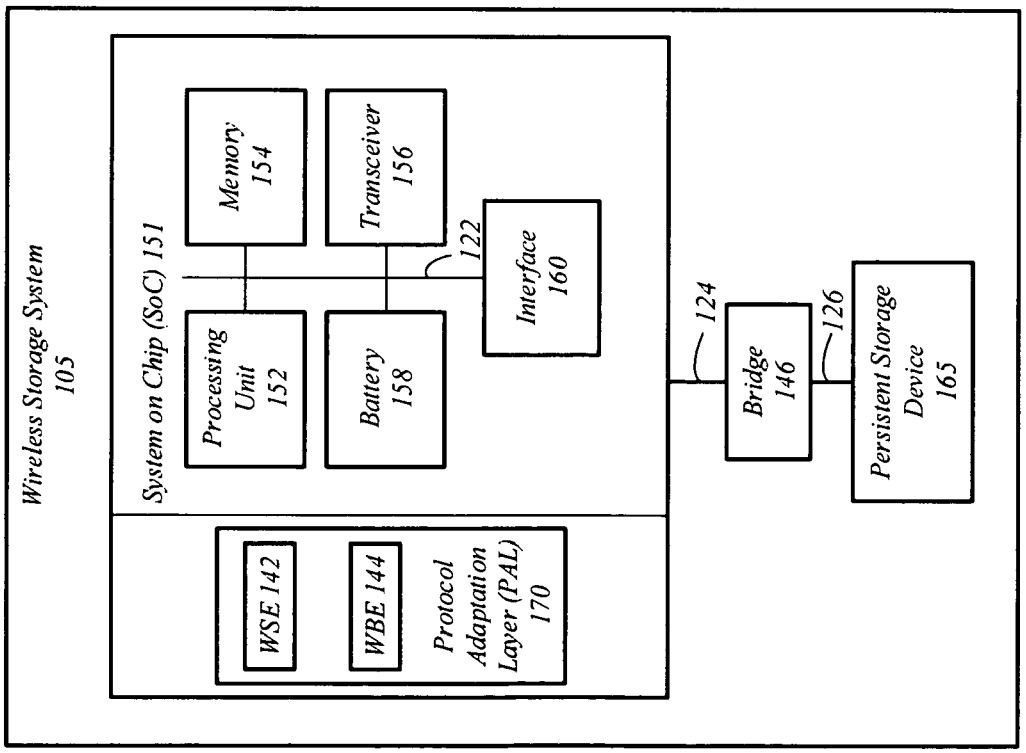

FIG. 1C illustrates an example of a compute system 140 having a wireless storage system 105 capable of communicating with one or more remote devices 110. In the illustrated example, the wireless storage system 105 may have the same components and elements discussed above with respect to FIGS. 1A and 1B. However, in the illustrated embodiment the persistent storage device 165 may be coupled with the SoC 151 via a bridge 146. The bridge 146 may be used to convert communications between bus types for interconnect 124 and interconnect 126. For example, the persistent storage device 165 may include a PCIe interface which may be coupled with the bridge 146 via interconnect 126 which may be a PCIe bus. The SoC 151 may include a USB interface coupled with the bridge 146 via interconnect 124 which may be a USB bus. The bridge 146 may enable communication between the two different interface types, USB and PCIe. In this example, the SoC 151 and processing unit 152 may utilize the WSE 142 to wirelessly communicate data to a remote device 110.

In another example, the persistent storage device 165 may include a USB interface which may be coupled with the bridge 146 via interconnect 126 which may be a USB bus. The SoC 151 may include a PCIe interface coupled with the bridge 146 via interconnect 124 which may be a PCIe bus. The bridge 146 may enable communication between the two different interface types, USB and PCIe. In this example, the SoC 151 and processing unit 152 may utilize the WBE 144 to wirelessly communicate data to a remote device 110.

Figure 1D:
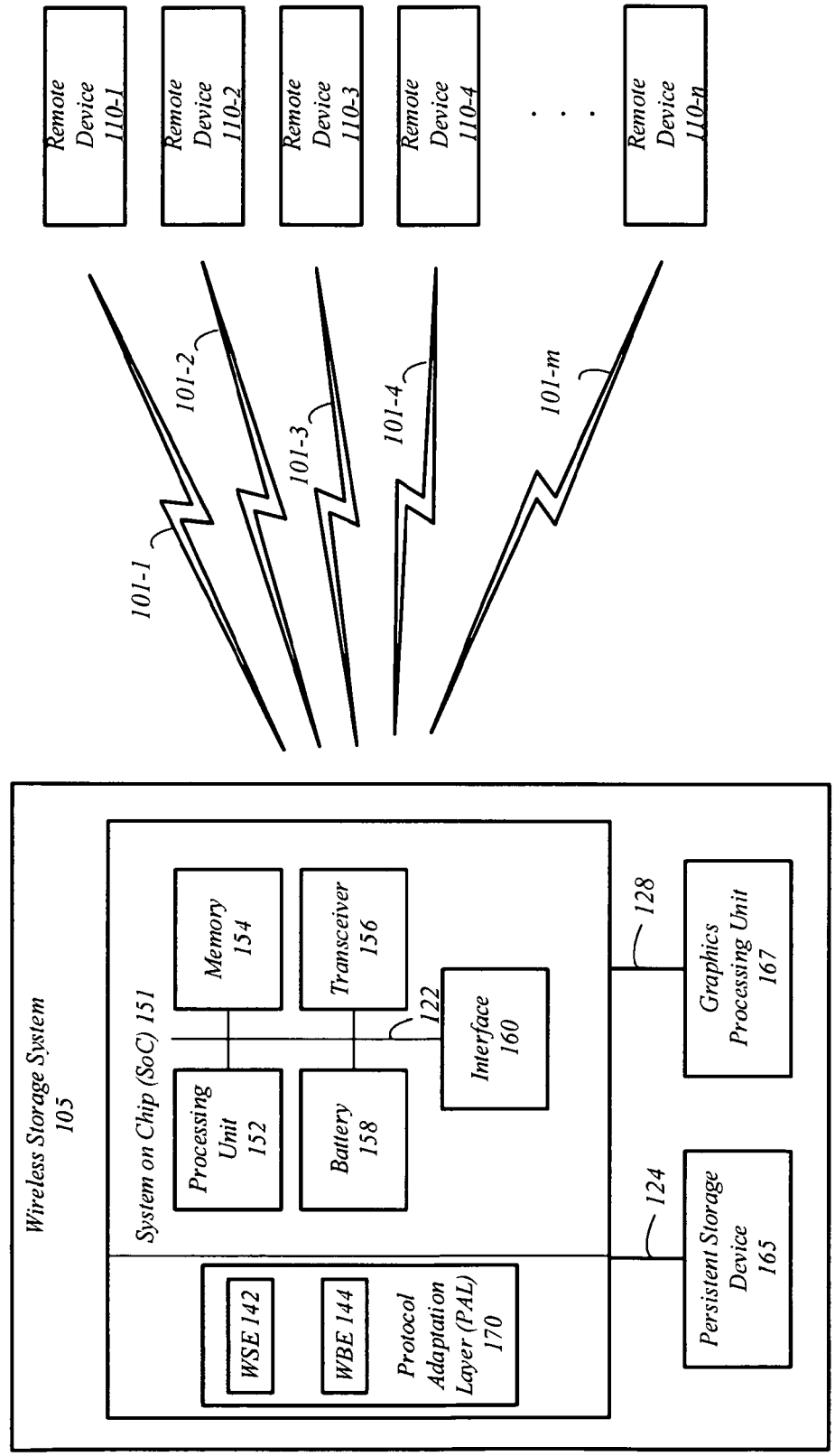

FIG. 1D illustrates example of a compute system 160 having a wireless storage system 105 capable of communicating with one or more remote devices 110. In the illustrated example, the wireless storage system 105 may have the same components and elements discussed above with respect to FIG. 1A-1C. However, in the illustrated embodiment, the wireless storage system 105 may include a graphics processing unit (GPU) 167 coupled with the SoC 151. More specifically, the GPU 167 may be coupled with the SoC 151 via interconnect 128. However, embodiments are not limited in this manner and GPU 167 may be implemented on or as part of the SoC 151.

The GPU 167 may be utilized to process data and instructions for the remote devices 110. For example, instructions may be communicated to the wireless storage system 105. The instructions may be received by the transceiver 156 and communicated to the GPU 167 by the processing unit 152 utilizing a PAL 170 extension, such as the WSE 142 and WBE 144 extensions, based on the interface 160 of SoC 151 coupled with the GPU 167.

The instructions may be any type of information and data that is capable of being processed by the GPU 167. For example, the instructions may include blocks of image or graphic data which may be processed by the GPU 167 in parallel. By utilizing the PAL 170 extensions and the transceiver 156 communicating in the 60 GHz frequency range, instructions may be communicated and processed by the GPU 167 and results may be returned to a remote device 110 in timely manner, e.g. in a manner in which a user of a remote device 110 may not experience any visual degradation on a display device. For example, the GPU 167 may process the instructions and return results to enable a 25 frames/second frame rate on a remote device 110.

Figure 1E:
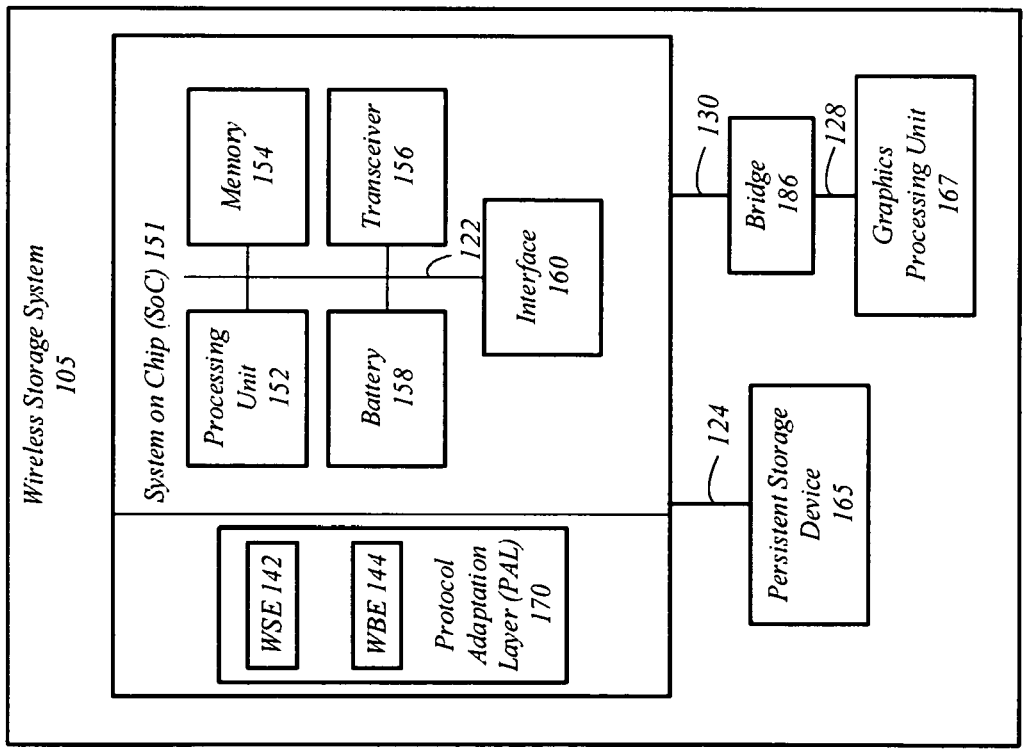

FIG. 1E illustrates an example of a compute system 180 having a wireless storage system 105 capable of communicating with one or more remote devices 110. In the illustrated example, the wireless storage system 105 may have the same components and elements discussed above with respect to FIG. 1A-1D. However, in the illustrated embodiment the GPU 167 may be coupled with the SoC 151 via a bridge 186. The bridge 186 may be used to convert communications between bus types for interconnect 128 and interconnect 130. For example, the persistent storage device 165 may include a PCIe interface which may be coupled with the bridge 186 via interconnect 128 which may be a PCIe bus. The SoC 151 may include a USB interface coupled with the bridge 186 via interconnect 130 which may be a USB bus. The bridge 146 may enable communication between the two different interface types, USB and PCIe. In this example, the SoC 151 and processing unit 152 may utilize the WSE 142 to wirelessly communicate data, instructions, and results to a remote device 110.

In another example, the GPU 167 may include a USB interface which may be coupled with the bridge 186 via interconnect 128 which may be a USB bus. The SoC 151 may include a PCIe interface coupled with the bridge 186 via interconnect 130 which may be a PCIe bus. The bridge 186 may enable communication between the two different interface types, USB and PCIe. In this example, the SoC 151 and processing unit 152 may utilize the WBE 144 to wirelessly communicate data, instructions and results to and from a remote device 110.

Figure 2A:
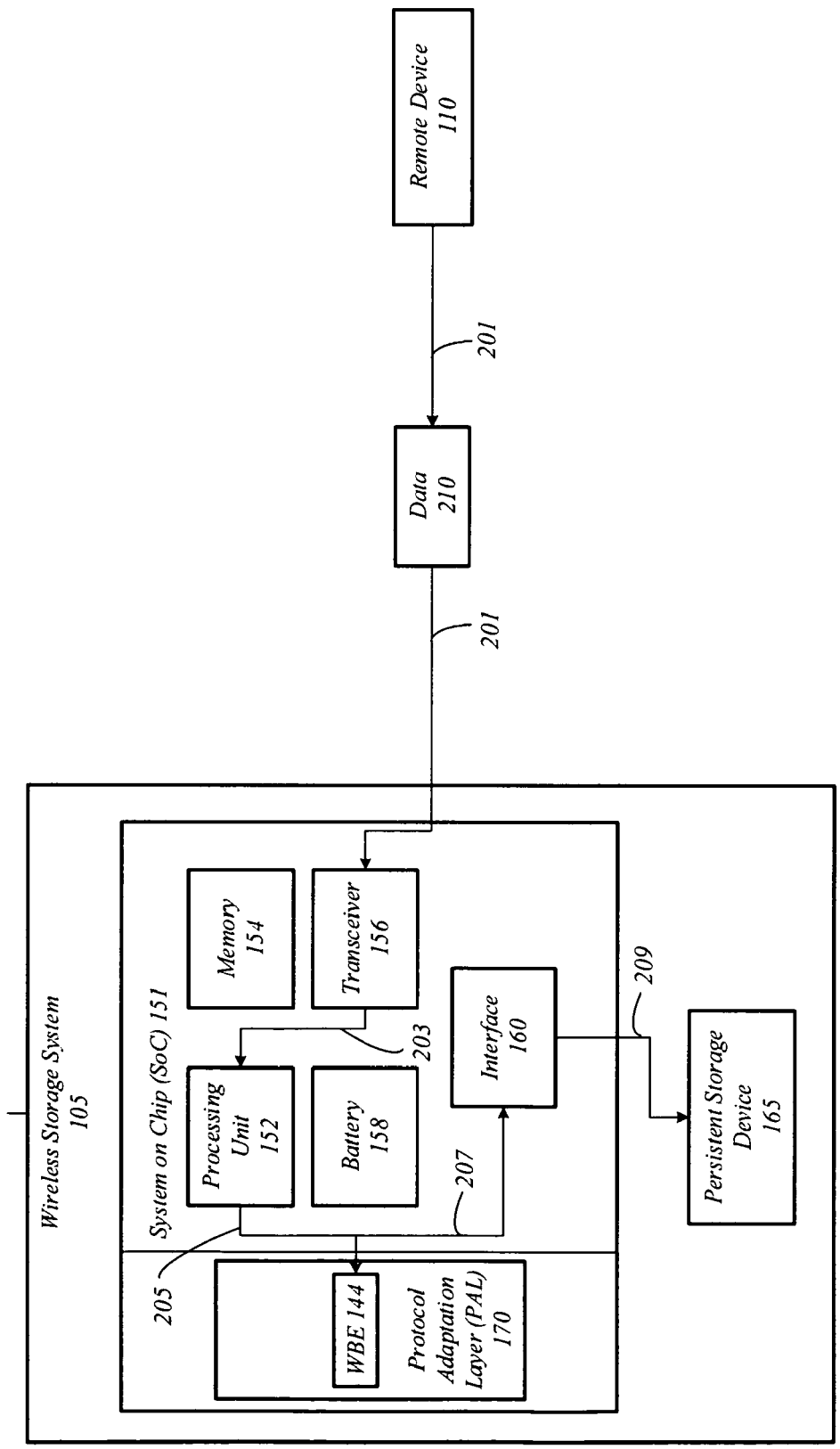
FIG. 2A-2D illustrate examples of flow diagrams for a compute system to provide and store data.

FIG. 2A/2B illustrate example flow diagrams 200 and 220 for a compute system, such as the compute system 120 discussed above in FIG. 1B. Flow diagram 200 illustrates data being written to the wireless storage system 105 and flow diagram 220 illustrates data being read from the wireless storage system 105.

In the illustrated example flow diagram 200, data 210 may communicated to the wireless storage system 105 from a remote device 110. More specifically, at line 201, the data 210 may be communicated between the remote device 110 and the wireless storage system 105. As previously mentioned, the data may be any type of data capable of being stored on the persistent storage device 165. In the illustrated example, the data 210 may be received by the transceiver 156 as one or more packets, frames, and so forth. Further, the data 210 may be communicated in the 60 GHz frequency in accordance with the IEEE 802.11ad standard, for example. The transceiver 156 may perform PHY layer and MAC layer processing on the data 210 and communicate the processed data 210 to the processing unit 152 at line 203. The processing unit 152 may perform additional processing, such as decoding or unwrapping the data 210. At line 205, the processing unit 152, utilizing the WBE 144, may also prepare the data 210 for storage in the persistent storage device 165. For example, the processing unit 152 may convert the data 210 from a format suitable for wireless communication to a format suitable for storage in accordance with the WBE 144. In some embodiments, at least a portion of processing the data to convert data from one format to another format may occur during the MAC and PHY layers processing by the processing unit 152. Embodiments are not limited in this manner.

The data 210 may be communicated to an interface 160 at line 207 over one or more interconnects, as previously discussed. In this example, the interface 160 is a PCIe interface and the interconnect is a PCIe bus. The interface 160 may communicate the data 210 to the persistent storage device 165 for storage at line 209. The data 210 may be communicated in a file format, a block format, an object format, and so forth. Embodiments are not limited in this manner and the format may be dependent on the type and configuration of the persistent storage device 165.

Figure 2B:
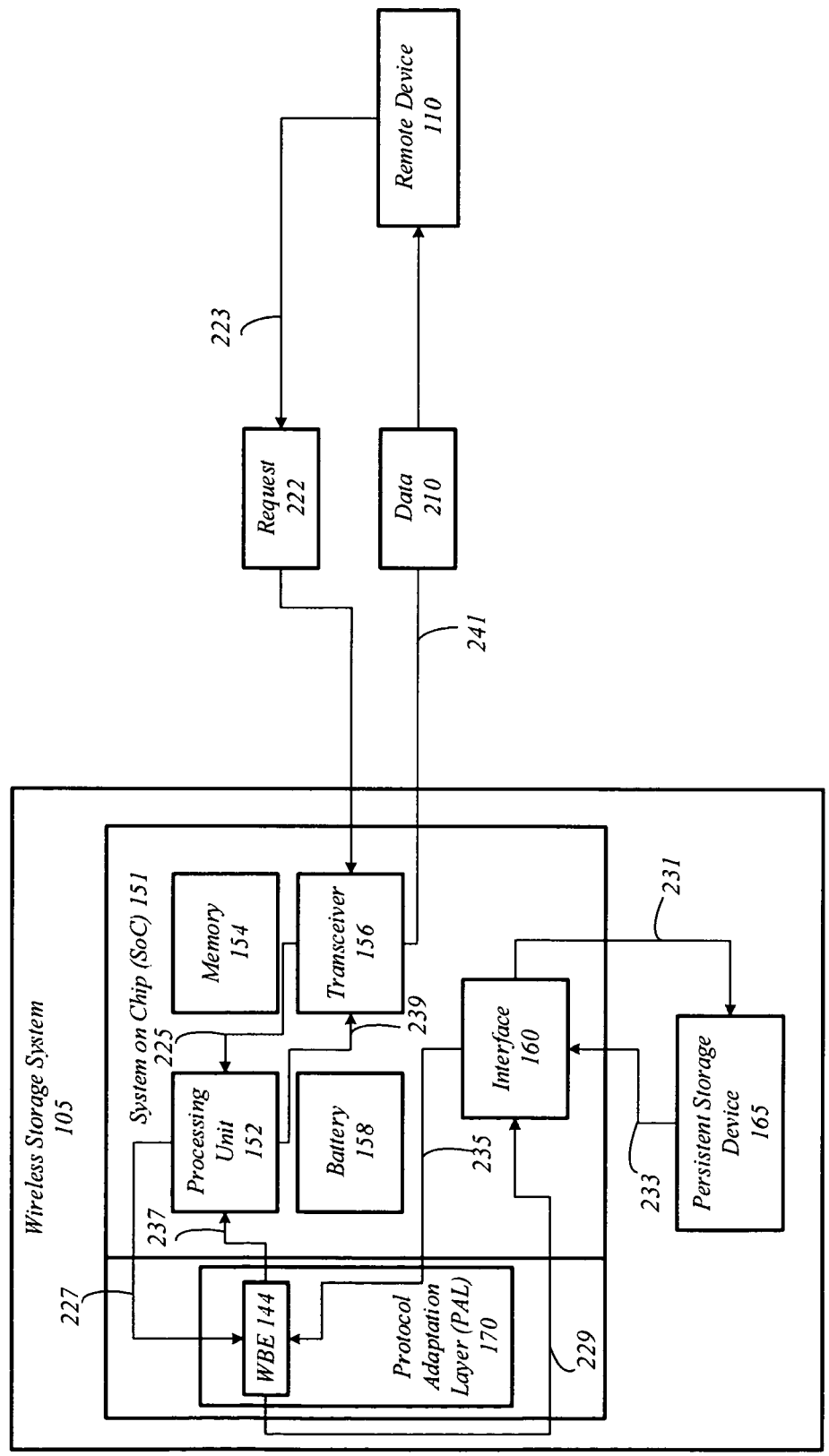

FIG. 2B illustrates data that may being retrieved from the persistent storage device 165. At line 223 a request for data may be communicated to the wireless storage system 105. At lines 225 and 227, the processing unit 152 may receive the request and process the request in accordance with the WBE 144. In some instances, the processing unit 152 may determine a location for the data being requested based on the request. At line 229, the processing unit 152 may communicate information to request the data to the interface 160. The persistent storage device 165 may receive the information at line 231 and retrieve the data. The information may be one or more read requests, for example.

At line 233, the data may be sent to the interface 160. The processing circuit 152 may receive the data, via the WBE 144, at line 235. The processing unit 152 may process the data utilizing the WBE 144. For example, the processing unit 152 may convert the data from a format suitable for storage to a format suitable for wireless communication. The data may be communicated to the processing unit 152 at line 237 and to the transceiver 156 at line 239. The transceiver 156 may perform MAC layer processing, PHY layer processing, and communicate the data to the remote device 110 at line 241. In some embodiments, the conversion between data formats may also occur during the MAC and PHY layer processing by the processing unit 152. Please note that, although WBE 144 is only illustrated in FIGS. 2A/2B, the WSE 142 may be present in the PAL 170.

Figure 2C:
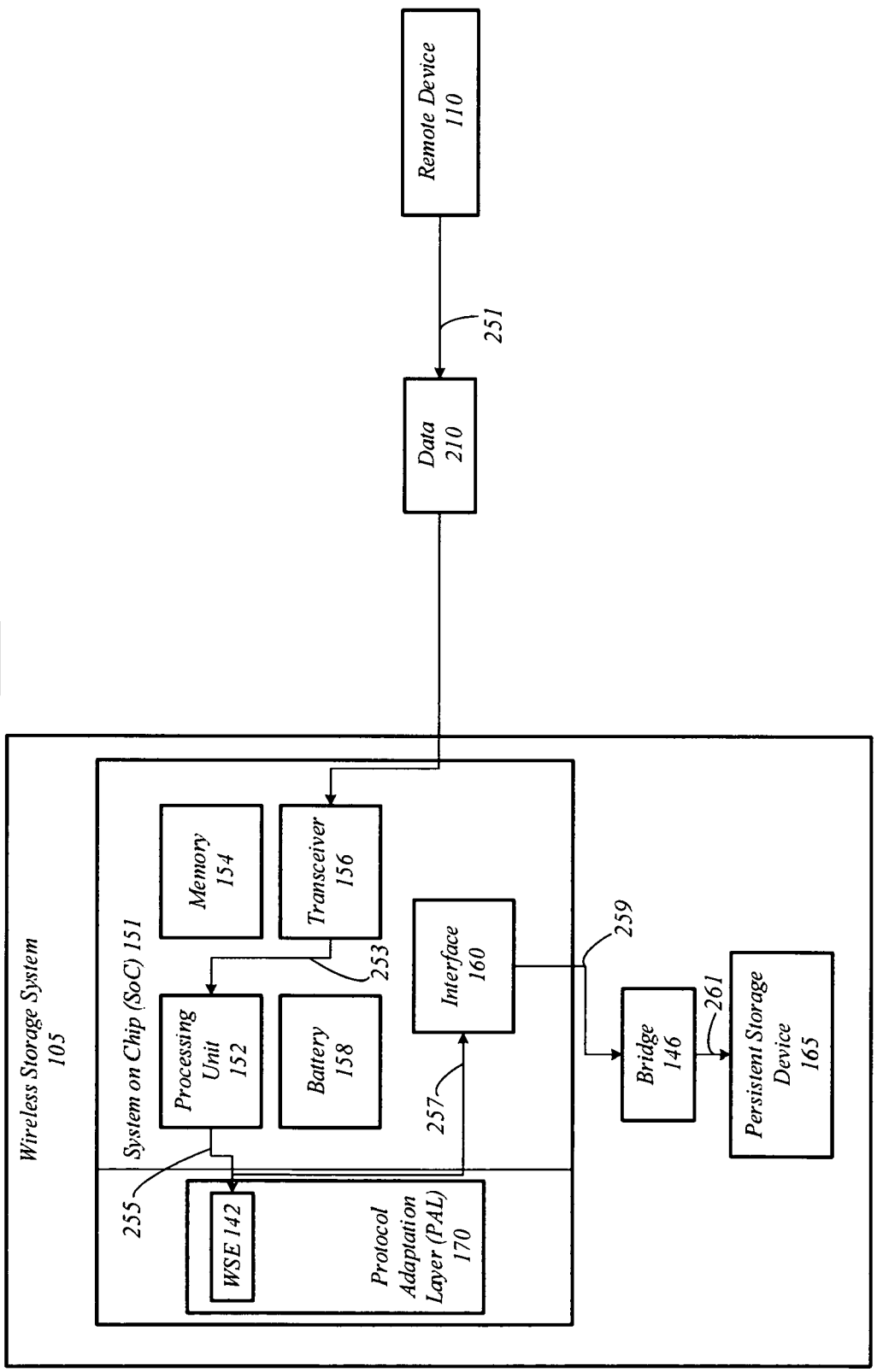

FIGS. 2C/2D illustrate example flow diagrams 250 and 270 for a compute system, such as the compute system 140 discussed above in FIG. 1C. As such, the wireless storage system 105 may include similar or the same liked name components previously discussed above in FIG. 1C. In the illustrated embodiment the persistent storage device 165 may be coupled with the SoC 151 via a bridge 146. The bridge 146 may be used to convert communications between bus types. For example, the persistent storage device 165 may include a PCIe interface which may be coupled with the bridge 146 via a PCIe bus. The SoC 151 may include a USB interface coupled with the bridge 146 via a USB bus. The bridge 146 may enable communication between the two different interface types, USB and PCIe. In this example, the SoC 151 and processing unit 152 may utilize the WSE 142 to wirelessly communicate data to a remote device 110.

In the illustrated example flow diagram 250, the data 210 may be communicated from a remote device 110. For example, at line 251 the data 210 may be communicated between the remote device 110 and the wireless storage system 105. The data 210 may be received by the transceiver 156 as one or more packets, frames, and so forth. Further, the data 210 may be communicated in the 60 GHz frequency in accordance with the 802.11ad standard, for example. The transceiver 156 may perform PHY layer and MAC layer processing on the data 210 and communicate the processed data 210 to the processing unit 152 at line 253. At line 255, the processing unit 152, utilizing the WSE 142, may prepare the data 210 for storage in the persistent storage device 165. For example, the processing unit 152 may convert the data 210 from a format suitable for wireless communication to a format suitable for storage. In this example, the interface 160 is a USB interface and the WSE 142 may be used to convert the data. However, if the interface 160 is a PCIe interface, the WBE 144 may be used to convert the data. In some instances, the conversion between different formats may at least partially occur during the MAC and PHY layer processing. Embodiments are not limited in this manner.

The data 210 may be communicated to an interface 160 at line 257 over one or more interconnects, as previously discussed. The interface 160 may communicate the data 210 to the persistent storage device 165 via the bridge 146 for storage at lines 259 and 261. The bridge 146 may enable communication between different interface types, such as USB to PCIe. Further, the data 210 may be communicated in a file format, a block format, an object format, and so forth. Embodiments are not limited in this manner and the format may be dependent on the type and configuration of the persistent storage device 165.

Figure 2D:
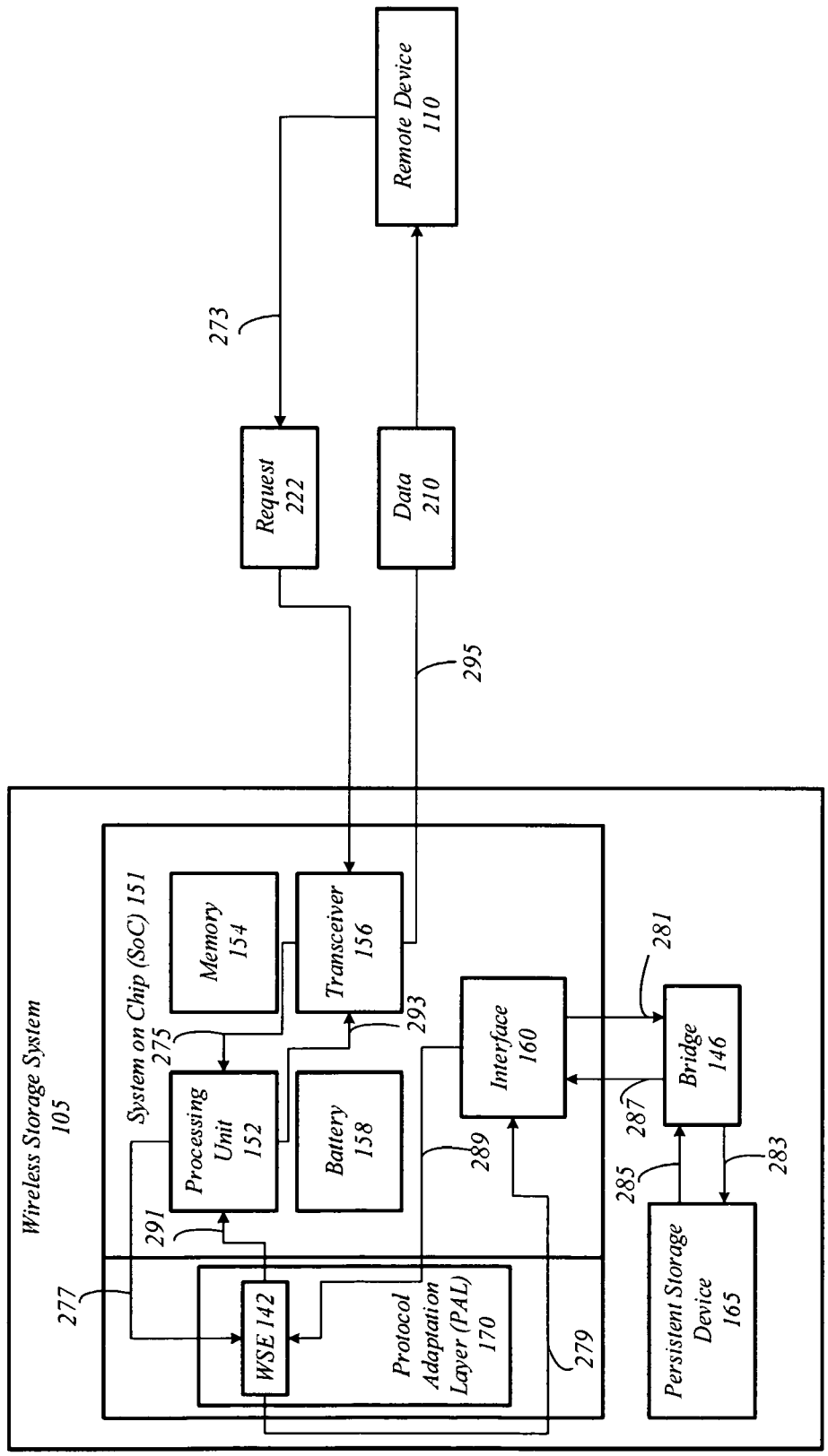

FIG. 2D illustrates a flow diagram 270 having a remote device 110 retrieving data from the wireless storage system 105. At line 273, the remote device 110 may communicate a request 222 for data. The request may be communicated to the processing unit 152 and processed in accordance with an PAL 170 extension. In this example, the WSE 142 may be utilized at lines 275 and 277 since the interface 160 is a USB interface. The request may be communicated to the interface 160 at line 279. Further, the interface 160 may communicate the request the to the persistent storage device 165 via the bridge 146 at lines 281 and 283.

The persistent storage device 165 may process the request by retrieving the data from storage and communicating the data to the interface 160 via the bridge 146 at lines 285 and 287. The interface may communicate the data to the WSE 142 for processing by the processing unit 152 at line 289. For example, the processing unit 152 may convert the data from a format suitable for storage to a format suitable for wireless communication in accordance with the WSE 142. At lines 291 and 293, the data may be communicated to the transceiver 156 for further processing and communication. For example, the transceiver 156 may perform MAC layer processing and PHY layer processing on the data. In some instances, the conversion between different formats may at least partially occur during the MAC and PHY layer processing and embodiments are not limited in this manner. The data 210 may be communicated to the remote device 110 at line 295. Please note that, although WBSE 142 is only illustrated in FIGS. 2C/2D, the WBE 144 may be present in the PAL 170.

Figure 3A:
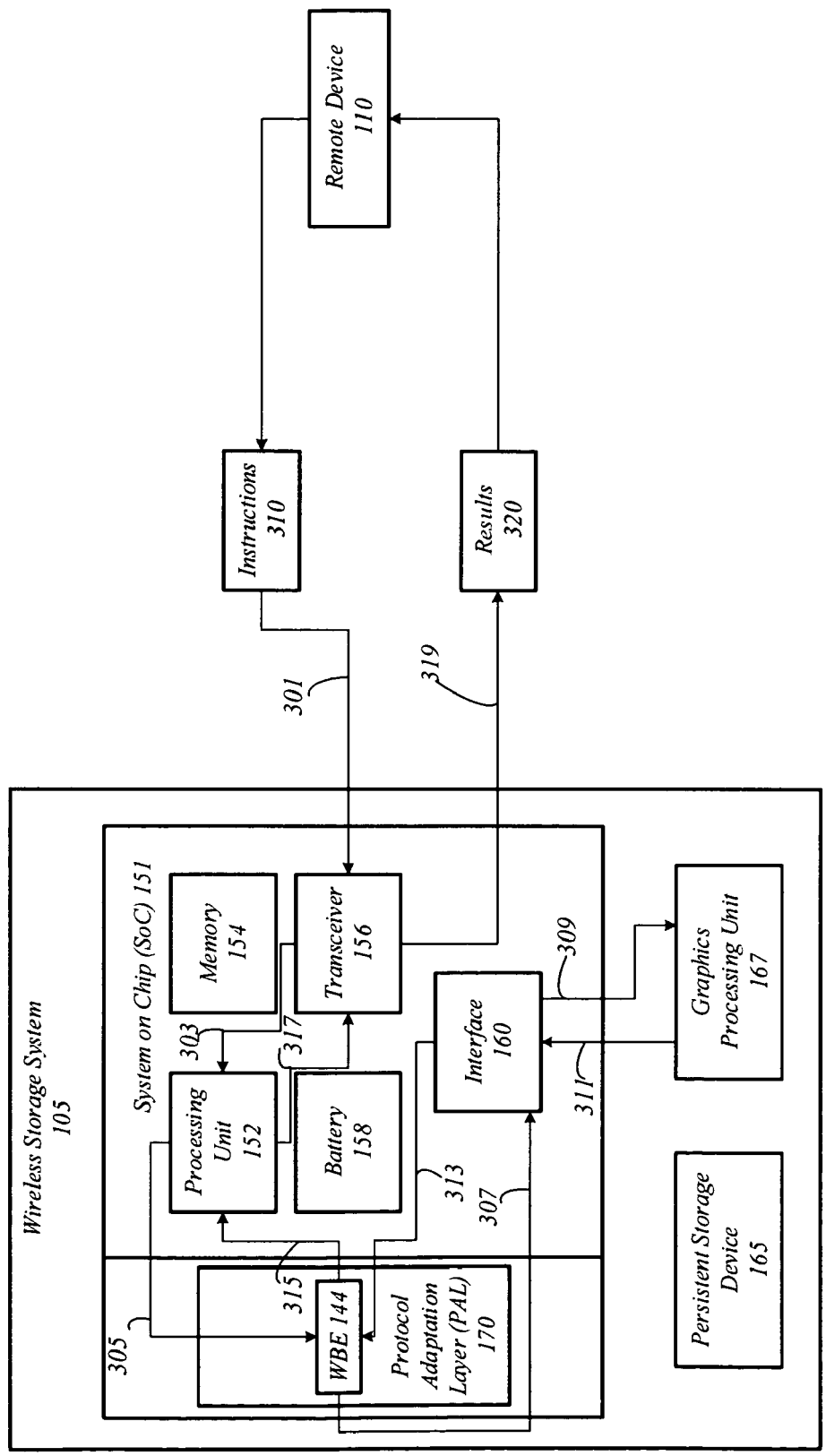
FIG. 3A/3B illustrate examples of flow diagrams for a compute system to process data.

FIG. 3A illustrates an example flow diagram 300 for a compute system, such as compute system 160 discussed above in FIG. 1D. As such, the wireless storage system 105 may include similar or the same liked name components previously discussed above in FIG. 1D. In the illustrated example flow diagram 300, instructions 310 may be communicated to the wireless storage system 105 and results 320 may be returned to the remote device 110. In instances, the instructions 310 may be image or visual data which may be processed in parallel by the GPU 167. However, embodiments are not limited in this manner. For example, the GPU 167 may be a processing device capable of process different types of instructions and information, such as statistical information, complex math information, large data sets, and other processing intensive information.

At line 301, one or more instructions may be communicated to the wireless storage system 105. As mentioned, the instructions may include information for processing by the GPU 167, such as video or image information. More specifically, the instructions 310 may include information to process a three-dimensional (3D) object or image for presentation on a display device, for example. Embodiments are not limited to this example.

The transceiver 156 receives the instructions 310 and performs PHY layer and MAC layer processing on the instructions 310. The instructions may 310 be processed by the processing unit 152 at line 303. In some embodiments, the instructions 310 may be processed by the processing unit 152 in accordance with the WBE 144 at line 305 and converted from a format for wireless communication to a format for processing by the GPU 167.

At line 307, the instructions may be communicated to interface 160, which in this example may be a PCIe interface. The instructions be communicated to the GPU 167 at line 309 over a PCIe bus. The GPU 167 may process the instructions, generate results 320 based on the instructions, and communicate the results 320 to the WBE 144 via the interface 160 at lines 311 and 313. The processing unit 152, utilizing the WBE 144, may convert the results 320 into a format capable for wireless communication in the 60 GHz frequency, for example.

At line 315, the results 320 may be communicated to the processing unit 152 and to the transceiver 156 at line 317. The transceiver 156 may perform MAC layer processing, PHY layer processing, and communicate the results 320 at line 319.

Figure 3B:
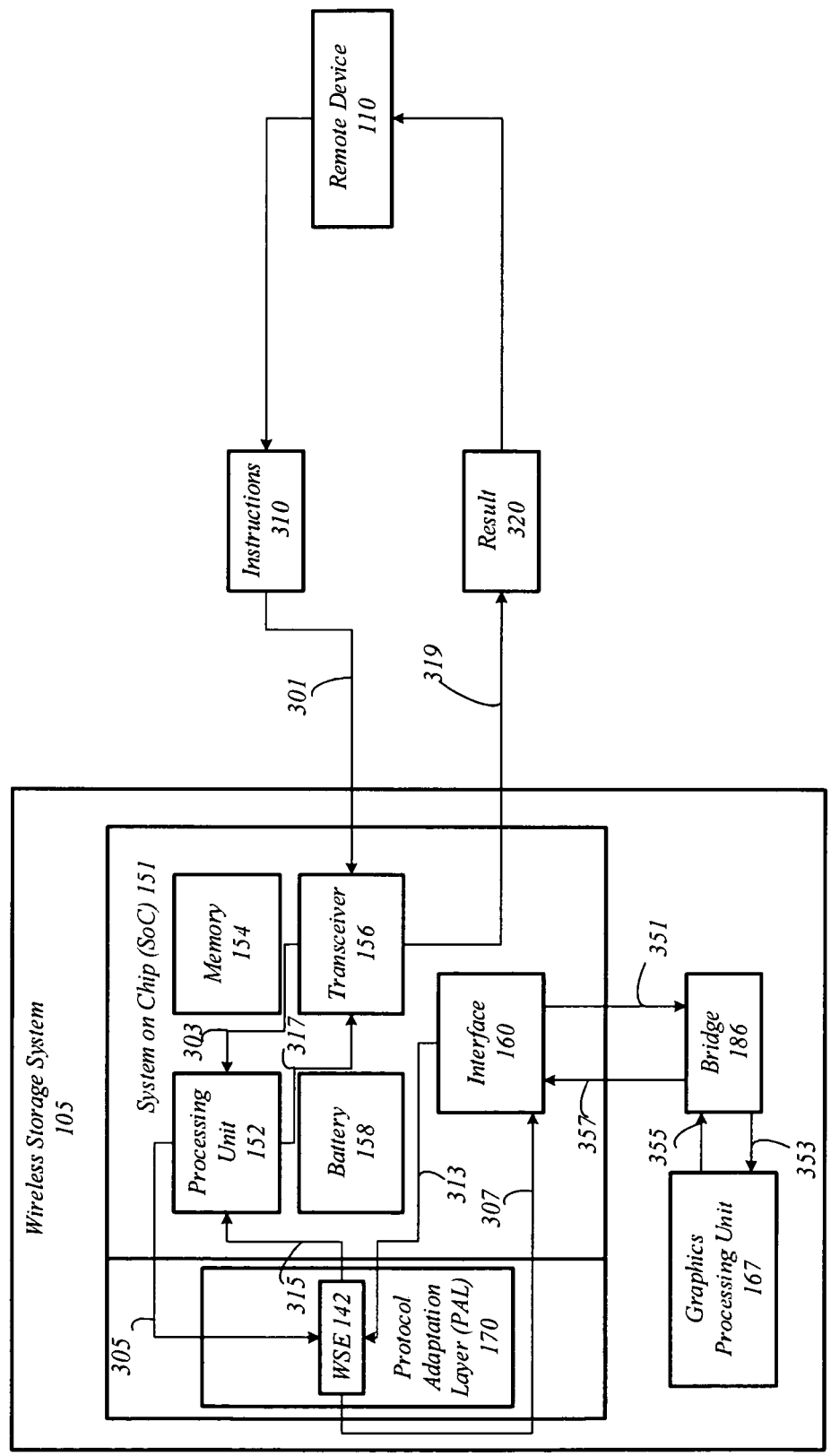

FIG. 3B illustrates an example flow diagram 350 for a compute system, such as compute system 180 discussed above in FIG. 1E. As such, the wireless storage system 105 may include similar or the same liked name components previously discussed above in FIG. 1E. In the illustrated example flow diagram 350, instructions 310 may be communicated to the wireless storage system 105 and results 320 may be returned to the remote device 110 as described above with respect to FIG. 3A. However, in the illustrated embodiments, the interface 160 may be a USB interface and the WSE 142 may be utilized to convert instructions 310 and results 320 into different formats, e.g. a format capable for wireless communication and a format capable for processing by the GPU 167. Further, a bridge 186 may be used between the interface 160 and the GPU 167 to communicate information from the USB interface to the GPU 167 having a PCIe interface.

More specifically, at line 351 instructions may be communicated from the interface 160 over a USB bus to the bridge 186. The bridge 186 may communicate the instructions to the GPU 167 over a PCIe bus at 353. In addition, the bridge 186 may perform processing to convert and enable communication of the instructions 310 to the GPU 167 over a PCIe bus. When communicating results 320 from the GPU 167, the opposite may occur. For example, at line 355 the GPU 167 may communicate the results 310 to the bridge 186 over PCIe bus. The bridge 186 may communicate the results to the interface 357 over a USB bus. Again, the bridge 186 may perform any necessary processing to convert and enable the results 320 for communication over the USB bus. The results may be communicated to the WSE 142, processed, and communicated to the remote device 310.

Figure 4A:
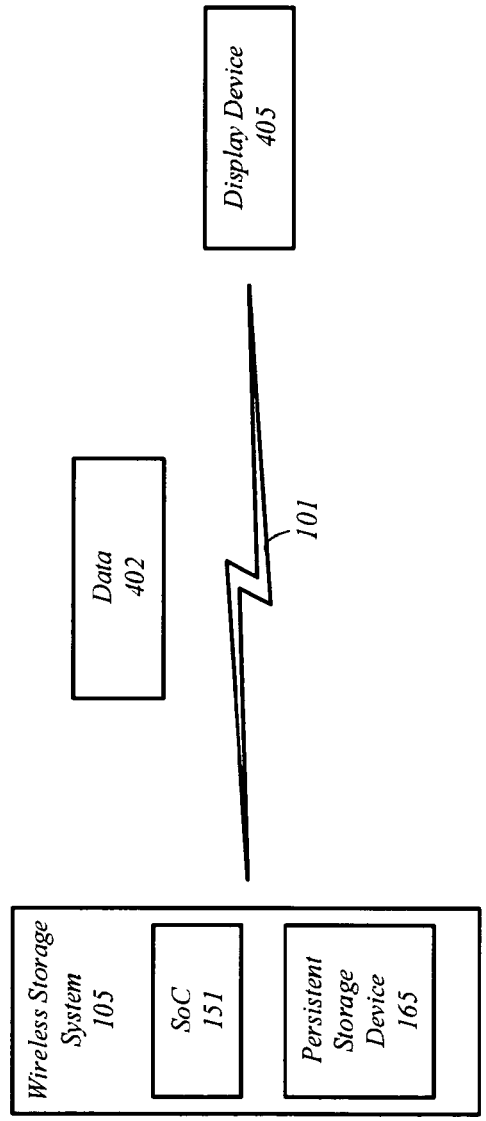
FIG. 4A-4G illustrate example use cases of a compute system.

FIG. 4A illustrates an example of a compute system 400 including a wireless storage system 105 and a display device 405. The wireless storage system 105 includes an SoC 151 and a persistent storage device 165 and may be the same or similar to any of the previously discussed wireless storage systems.

The display device 405 may be any digital display capable of presenting information and data. For example, the display device 405 may be television, an LCD display, a LCD television, a computer display, mobile device display, a handheld device display, or any other type of display discussed herein. Embodiments are not limited to these examples.

In embodiments, the wireless storage system 105 may establish a wireless connection 101 with a display device 405 to communicate data 402. In some embodiments, the wireless connection 101 may be a peer-to-peer (P2P) connection and the wireless storage system 105 may perform a service discovery mechanism to discover the display device 405. The service discovery mechanism may include communicating or indicating the capabilities of the wireless storage system 105, e.g. supported PAL extensions, frequency bandwidth, and type of data available. For example, the wireless storage system 105 may communicate one or more discovery frames, such as beacon frames, including an indication of supported PAL extensions (WSE and WBE), 60 GHz frequency band, and media data. The display device 405 may receive the one or more discovery frames and send one or more response frames indicating whether the display device 405 wants to connect. The response frames may also include an indication as to which PAL extension to use for the connection. In instances, the frames, e.g. the discovery and response frames, may be communicated on a same frequency band indicated to establish the wireless connection, e.g. 60 GHz frequency band. However, in other instances, the frames may be communicated on a different frequency, e.g. 2.4 GHz and/or 5 GHz. For example, the desired frequency for the wireless connection 101 may be in the 60 GHz frequency band and the discovery frames/response frames may be communicated in the 2.4 GHz and/or 5 GHz frequency bands.

The wireless storage device 105 may establish the wireless connection 101 with the display device 405 based on the discovery mechanism and frame exchanges. The wireless connection 101 may be established in the 60 GHz frequency using one or more of the WBE and WSE, for example. In some embodiments, the wireless storage device 105 may communicate over the wireless connection 101 with the display device 405 in accordance with one or more of IEEE 802.11ad Standard, the Media Agonistic USB Standard, and the Wi-Fi Alliance WiGig WBE Standard In embodiments, the wireless storage device 105 may provide data 402 to the display device 405 for presentation. The data 402 may be a 4k video stream which may generally be known as a 1080p/120 video stream, an Ultra HD video stream, a 4k digital video stream, and so forth. The 4k video stream may conform with one more standards, such as the Digital Cinema Initiatives (DCI) 4k resolution standard, the 4k ultra-high-definition television standard version 1 (UHD-1), and version 2 (UHD-2). In embodiments, the video stream may have a resolution (# of pixels×# of pixels) of 3840×2160, 4096×2304, 5120×2160, 5120×3200, 4096×2160, 4096×1716, and 3996×2160. Embodiments are not limited to these examples. For example, the data 402 may be a different type of displayable content including a HD image, a standard-definition (SD) image, an SD video stream, and so forth. The wireless storage device 105 may communicate the data 402 and the display device 405 may present the data 402 until the wireless connection 101 is lost, the wireless connection 101 is terminated, a user terminates the communication of the data 402 and/or the wireless connection 101, and so forth.

In embodiments, a user may interact with the wireless storage system 105 to enable and/or cause the wireless storage system 105 to establish a connection with the display device 405 and provide the data 402. For example, the wireless storage system 105 may include an input device, such as a button, wheel, touch sensor, and so forth, to enable a user to trigger the discovery mechanism. The input device may enable a user to select a which data 402 for display on the display device 405. For example, a listing of data 402 may be presented on the display device 405 and a user may browse and make a selection using the input device.

In some embodiments, the wireless storage system 105 may not have an input device, and the user may interact with the wireless storage system 105 using an input device of the display device 405. For example, the wireless connection 101 may be established automatically and a user may interact with the wireless storage device 105 using an input device of the display device 405. The wireless storage device 105 may automatically establish the wireless connection 101 by periodically communicating one or more discovery frames, for example. Embodiments are not limited in this manner.

Figure 4B:
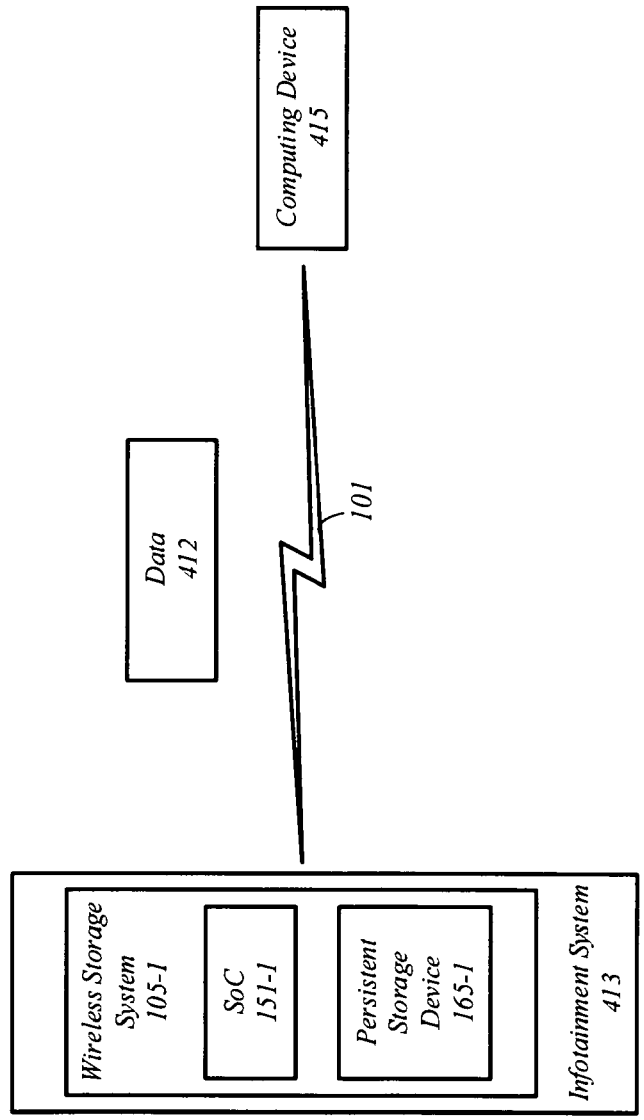

FIG. 4B illustrates an example of a compute system 410 including a wireless storage system 105 which may be implemented as part of infotainment system 413. The wireless storage system 105 includes a SoC 151 and a persistent storage device 165 and may be the same or similar to any of the previously discussed wireless storage systems.

In the illustrated example, the infotainment system 413 may be a vehicle infotainment system located within a vehicle and may communicate with another computing device 415 which may be located within a vehicle, a toll booth, a building or house, and so forth. In some instances, the computing device 415 may be another infotainment system including a wireless storage system. However, embodiments are not limited in this manner and the computing device 415 may be another type of computing device.

In embodiments, the wireless storage system 105 of the infotainment system 413 may establish a wireless connection 101 with the computing device 415, as previously discussed above in FIG. 4A. For example, the wireless storage system 105 may perform a discovery mechanism to establish the wireless connection 101. In some embodiments, the wireless connection 101 can be established in the 60 GHz range utilizing at least one of the PAL extensions to enable high speed data transfer between the infotainment system 413 and the computing device 415.

The infotainment system 413 may communicate data 412 with the computing device over the wireless connection 101. The data 412 may include any type of data such as the media data as previously discussed above. For example, the infotainment system 413 may stream a video to the computing device 415 via the wireless connection 101. In another example, the infotainment system 413 may receive a video stream from the computing device 415. In this example, the video stream may be for instant playback on a display of the infotainment system 413 or for storage on the wireless storage system 105 for later playback. Embodiments are not limited to these examples.

In some embodiments, the infotainment system 413 may communicate other data, such as map data, travel data, infotainment firmware data, vehicle computer data, and so forth with the compute device 415. For example, the infotainment system 413 may receive map data which can include one or more high resolution maps. The map data may be stored on the wireless storage system 105 for later use. In another example, the infotainment system 413 may receive travel data, which may include travel data about a trip, route information on a map, information about hotels, gas stations, rest areas, attractions, travel discounts, traffic, and any other type of information related to travel by vehicle.

In another example, the infotainment system 413 may receive infotainment firmware data to update the firmware on the infotainment system 413 itself. In another example, the infotainment system 413 may receive vehicle computer data to update one or more computers, controllers, modules, components, and so forth of a vehicle. For example, the vehicle computer data may include information to update transmission settings, engine setting, emission settings, or any other computer control settings of the vehicle. Embodiments are not limited in this manner.

The infotainment system 413 may communicate the data 412 with the computing device 415 in accordance with one or more of the data communication methods discussed herein. For example, the infotainment system 413 may communicate the data 412 in the 60 GHz frequency band utilizing a PAL extension, as previously discussed above.

Figure 4C:
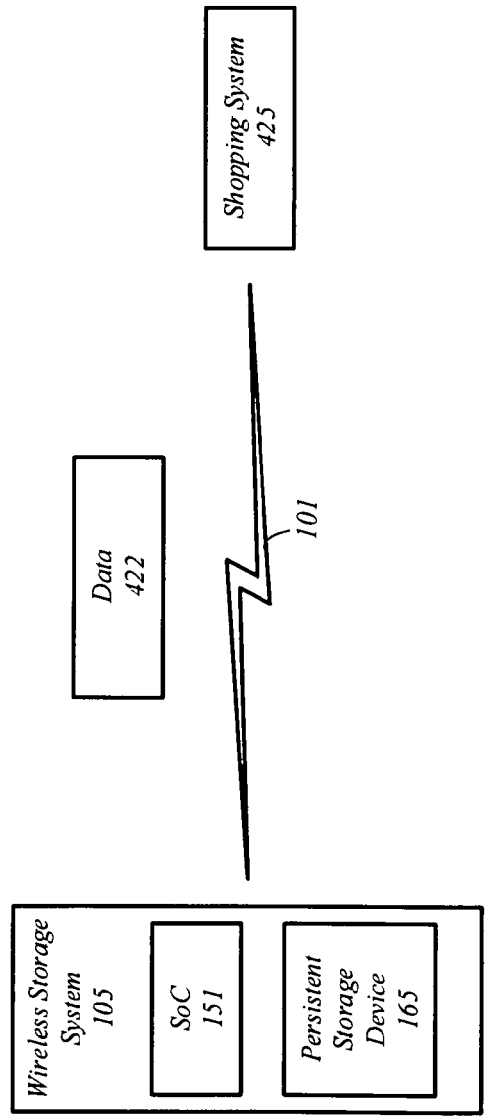

FIG. 4C illustrates an example of a compute system 420 including a wireless storage system 105 capable of communicating with a shopping system 425. The wireless storage system 105 includes a SoC 151 and a persistent storage device 165 and may be the same or similar to any of the previously discussed wireless storage systems.

The shopping system 425 may include any compute device to process shopping information. For example, the shopping system 425 may include a kiosk computing device, a point of sale computing device, a barcode scanning device, and so forth.

In the illustrated example, the wireless storage system 105 may establish a wireless connection 101 with the shopping system 425, as previously discussed above in FIG. 4A. For example, the wireless storage system 105 may perform a discovery mechanism to establish the wireless connection 101. In some embodiments, the wireless connection 101 can be established in the 60 GHz range utilizing at least one of the PAL extensions to enable high speed data transfer between the wireless storage system 105 and the shopping system 425.

The wireless storage system 105 may communicate data 422 with the shopping system 425 over the wireless connection 101. The data 422 may include any type of data such as the media data as previously discussed above. For example, the wireless storage system 105 can communicate a video stream, high-definition images, three-dimensional images, and so forth with the shopping system 425. The media data my include information, such as advertisements that may be stored and played back on the wireless storage system 105.

In another example, wireless storage system 105 may communicate data 425 including coupon information, receipt information, sale information, price information, and so forth with the shopping system 425 via the wireless connection 101. In this example, the wireless storage system 105 may receive the data 425 and store it on a persistent storage device 165, for example. The wireless storage system 105 may also communicate data 425 including payment information with the shopping system 425. The payment information can include any information that may be used to pay for an item, for example. Embodiments are not limited to these examples.

The wireless storage system 105 may communicate the data 422 with the shopping system 425 in accordance with one or more of the data communication methods discussed herein. For example, the wireless storage system 105 may communicate the data 422 in the 60 GHz frequency band utilizing a PAL extension, as previously discussed above.

Figure 4D:
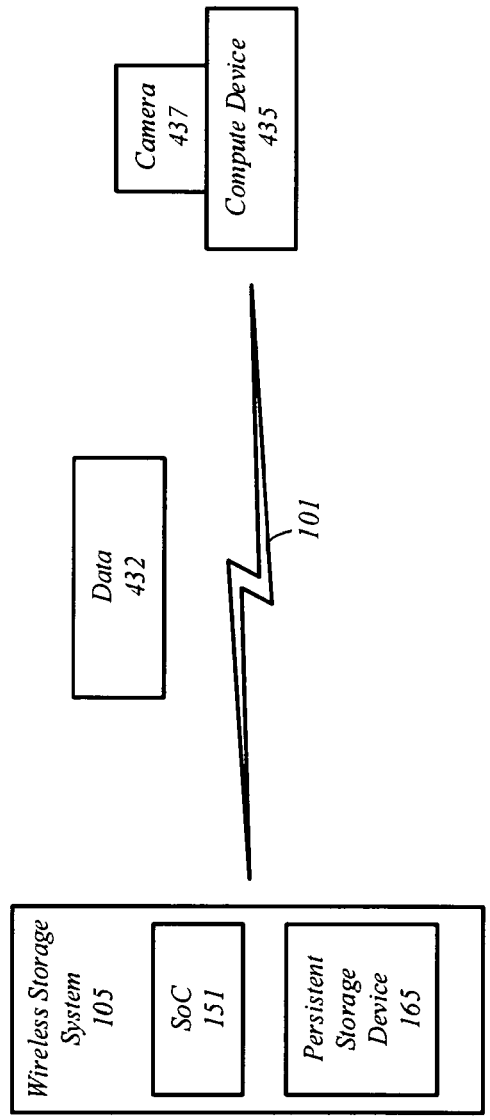

FIG. 4D illustrates an example of a compute system 430 including a wireless storage system 105 capable of communicating with a computing device 435 coupled with a camera 437. The wireless storage system 105 includes a SoC 151 and a persistent storage device 165 and may be the same or similar to any of the previously discussed wireless storage systems.

The computing device 435 may include a personal computer, a mobile computing device, a personal digital assistant, a mobile phone, a smart phone, and any other system and device discussed herein. Further, the camera 437 may be any type of digital camera capable of capture an image in a digital format. In some embodiments, the camera 437 may be digital video camera capable of capturing a video stream in a digital format. Embodiments are not limited in this manner.

In the illustrated example, the wireless storage system 105 may establish a wireless connection 101 with the computing device 435, as previously discussed above in FIG. 4A. For example, the wireless storage system 105 may perform a discovery mechanism to establish the wireless connection 101. In some embodiments, the wireless connection 101 can be established in the 60 GHz range utilizing at least one of the PAL extensions to enable high speed data transfer between the wireless storage system 105 and the computing device 435.

The wireless storage system 105 may communicate data 432 with the computing device 435 over the wireless connection 101. The data 432 may include image and/or video data captured by the camera 437, for example. The image and videos may be formatted as HD, Ultra HD, 4k, and so forth and stored on the wireless storage system 105. For example, the wireless storage system 105 can communicate a video stream, high-definition images, three-dimensional images, captured by the camera 437 to store in a persistent storage device 165. In addition, the video and images may be communicated from the wireless storage system 105 may be communicated to the computing device 435 for playback.

The wireless storage system 105 may communicate the data 432 with the computing device 435 in accordance with one or more of the data communication methods discussed herein. For example, the wireless storage system 105 may communicate the data 432 in the 60 GHz frequency band utilizing a PAL extension, as previously discussed above.

Figure 4E:
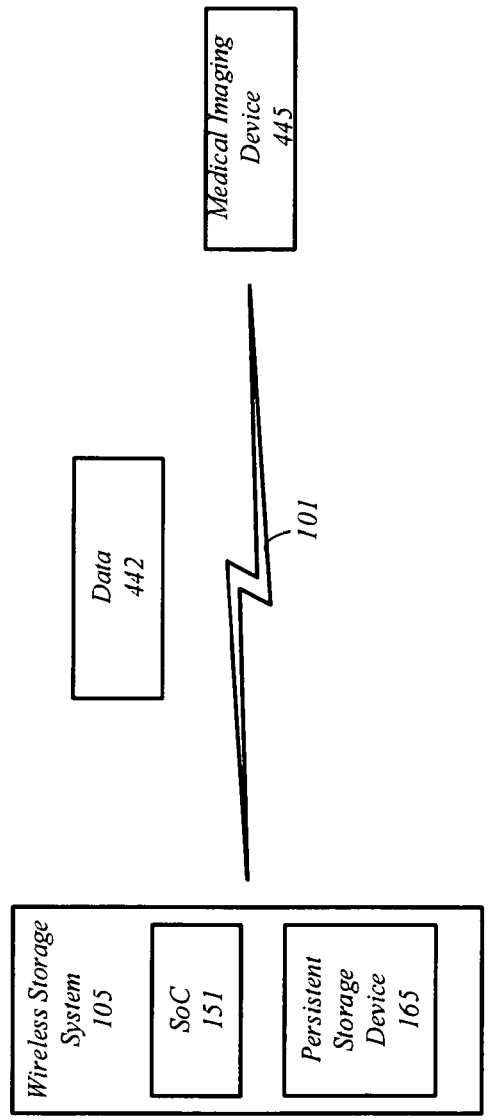

FIG. 4E illustrates an example of a compute system 440 including a wireless storage system 105 capable of communicating with a medical imaging device 445. The wireless storage system 105 includes a SoC 151 and a persistent storage device 165 and may be the same or similar to any of the previously discussed wireless storage systems. In embodiments, the wireless storage system 105 may establish a wireless connection 101 with the medical imaging device 445 in a manner similar to that previously discussed above in FIG. 4A.

The medical imaging device 445 may be a device capable of taking and/or presenting a medical image. For example, the medical imaging device 445 may be a X-ray radiography device, a magnetic resonance imaging (MRI) device, a medical ultrasonography or ultrasound device, an endoscopy, an elastography, a tactile imaging device, a thermography device, a medical photography device, computer tomography (CT) scanning device, and a nuclear medicine functional imaging device.

In the illustrated example, the wireless storage system 105 may receive and send data 442 to the medical imaging device 445. More specifically, the wireless storage system 105 may receive and store the data 442 in a persistent storage device 165, for example. In another example, the wireless storage system 105 may send the data 442 from the persistent storage device 165 to the medical imaging device 445 or another device for presentation. The medical imaging device 445 or another device may include a display to present the data 442, for example.

The data 442 may include medical images and/or videos. The images and videos may be formatted as HD, Ultra HD, 4k, and so forth and stored on the wireless storage system 105. For example, the wireless storage system 105 can communicate a video stream, high-definition images, three-dimensional images, to and from the medical imaging device 445. The wireless storage system 105 may communicate the data 442 with the computing device 445 in accordance with one or more of the data communication methods discussed herein. For example, the wireless storage system 105 may communicate the data 442 in the 60 GHz frequency band utilizing a PAL extension, as previously discussed above.

Figure 4F:
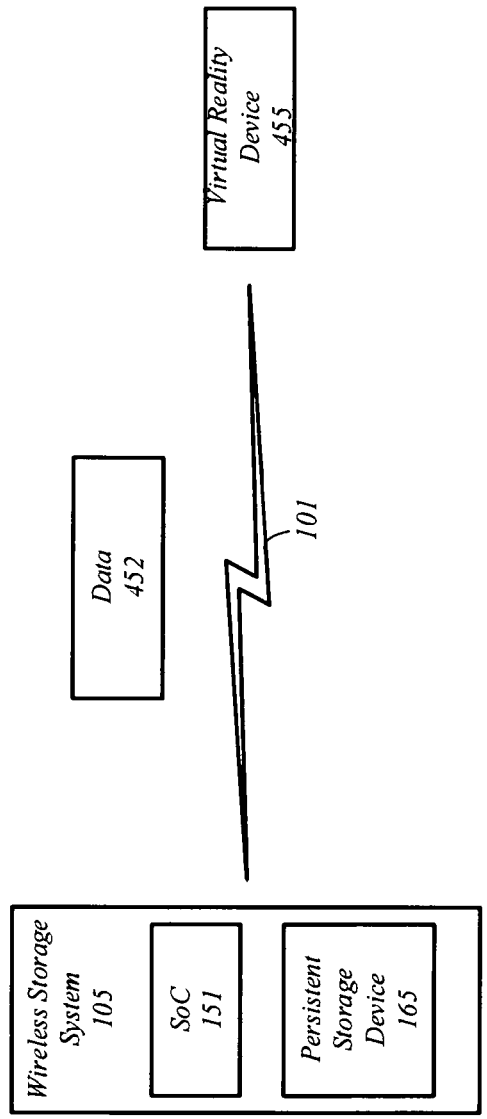

FIG. 4F illustrates an example of a compute system 450 including a wireless storage system 105 capable of communicating with a virtual reality device 455. The wireless storage system 105 includes a SoC 151 and a persistent storage device 165 and may be the same or similar to any of the previously discussed wireless storage systems. In embodiments, the wireless storage system 105 may establish a wireless connection 101 with the virtual reality device 455 in a manner similar to that previously discussed above in FIG. 4A.

The virtual reality device 455 may be an immersive multimedia device, a computer-simulated life device, or any other device capable of replicating an environment that simulates physical presence in places in the real world or imagined worlds and lets the user interact in that world. The virtual reality device 455 may be a virtual reality headset having a display device in front of one eye (monocular) or each eye (binocular). The virtual reality headset may also be a wearable display that has the capability of reflecting projected images as well as allowing the user to see through it. Embodiments are not limited in this manner.

The wireless storage system 105 may communicate data 452 with the virtual reality device 455 which may enable a user to experience a virtual reality. For example, the wireless storage system 150 may communicate the data 452 which may be HD image and/or HD video data that may be presented on a display of the virtual reality device 455, for example. In another example, the data 452 may also include audio data which may be played through speakers of the virtual reality device 455, for example. The data 452 may also include other data, such haptic feedback data. Embodiments are not limited in this manner.

In some embodiments, the wireless storage device 105 may receive and store the data 452 from the virtual reality device 455. For example, the wireless storage device 105 may receive data 452 generated from one or more sensors present on the virtual reality device 455 and store the data 452 in the persistent storage device 165. Embodiments are not limited in this manner.

The wireless storage system 105 may communicate the data 452 with the virtual reality device 455 in accordance with one or more of the data communication methods discussed herein. For example, the wireless storage system 105 may communicate the data 442 in the 60 GHz frequency band utilizing a PAL extension, as previously discussed above.

Figure 4G:
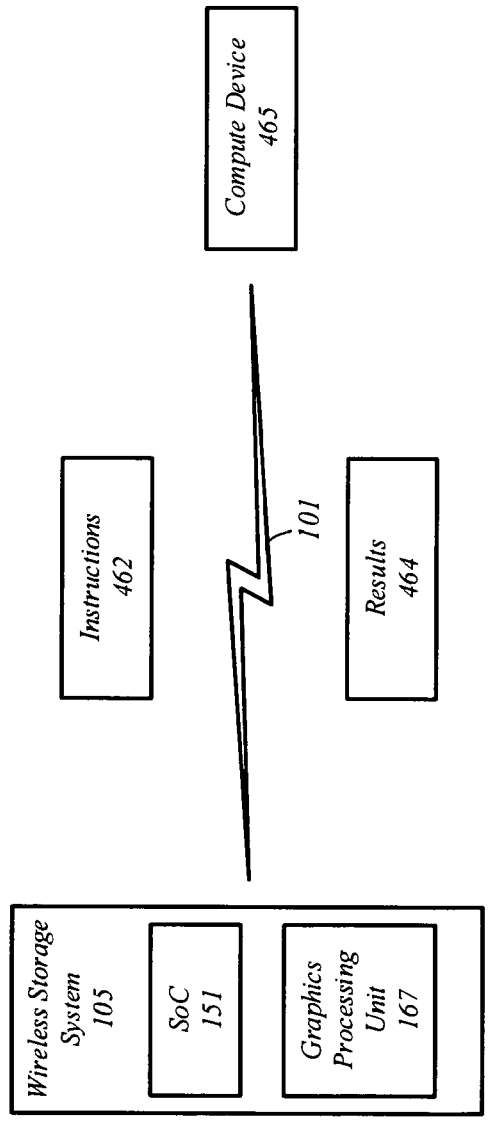

FIG. 4G illustrates an example of a compute system 460 including a wireless storage system 105 capable of communicating with a compute device 465. The compute device 465 may be any device or system described herein. The wireless storage system 105 includes a SoC 151 and a GPU 167 and may be the same or similar to any of the previously discussed wireless storage systems. For example, the wireless storage system 105 may also include a persistent storage device (not shown). In embodiments, the wireless storage system 105 may establish a wireless connection 101 with the virtual reality device 455 in a manner similar to that previously discussed above in FIG. 4A In the illustrated embodiment, the wireless storage system 105 may communicate information, such as instructions 462 and results 464, with the compute device 465. In some embodiments, the wireless storage system 105 may receive instructions 462 from the compute device 465, process the instructions, and return results 464 to the compute device 465. The wireless storage system 105 may utilize the GPU 167 to the process the instructions 462, such as image and/or video data. However, embodiments are not limited in this manner, the instructions 462 may be processed by a processing unit, for example, and results may be returned to the compute device 465 by the wireless storage system 105. Further, instructions 462 are not limited to compute instructions per se, but may also include any data or/and information that may be processed by a processing unit or the GPU 167.

The wireless storage system 105 may communicate the instructions 462 and results 464 with the compute device 465 in accordance with one or more of the data communication methods discussed herein. For example, the wireless storage system 105 may communicate the instructions 462 and results 464 in the 60 GHz frequency band utilizing a PAL extension, as previously discussed above.

FIGS. 4A-4G illustrate specific examples of compute systems. Embodiments are not limited to these examples. Other examples may be contemplated for utilizing a wireless storage system 105 and communicating data over a wireless connection 101 in the 60 GHz frequency utilizing one or more PAL extensions.

FIG. 5 illustrates an embodiment of a logic flow diagram 500. The logic flow 500 may be representative of some or all of the operations executed by one or more embodiments described herein. For example, the logic flow 500 may illustrate operations performed by one or more systems and devices in FIGS. 1A-4G. Various embodiments are not limited in this manner.

In various embodiments, the logic flow 500 may include utilizing, by a processing unit, a protocol adaption layer (PAL) extension based on the bus protocol to enable a wireless transfer of data between a persistent storage device and a remote device at block 505.

The logic flow 500 may also include communicating, via a transceiver, the data as radio-frequency (RF) signals between the persistent storage device and the remote device utilizing the PAL extension, at block 510. Embodiments are not limited in this manner.

Figure 6:
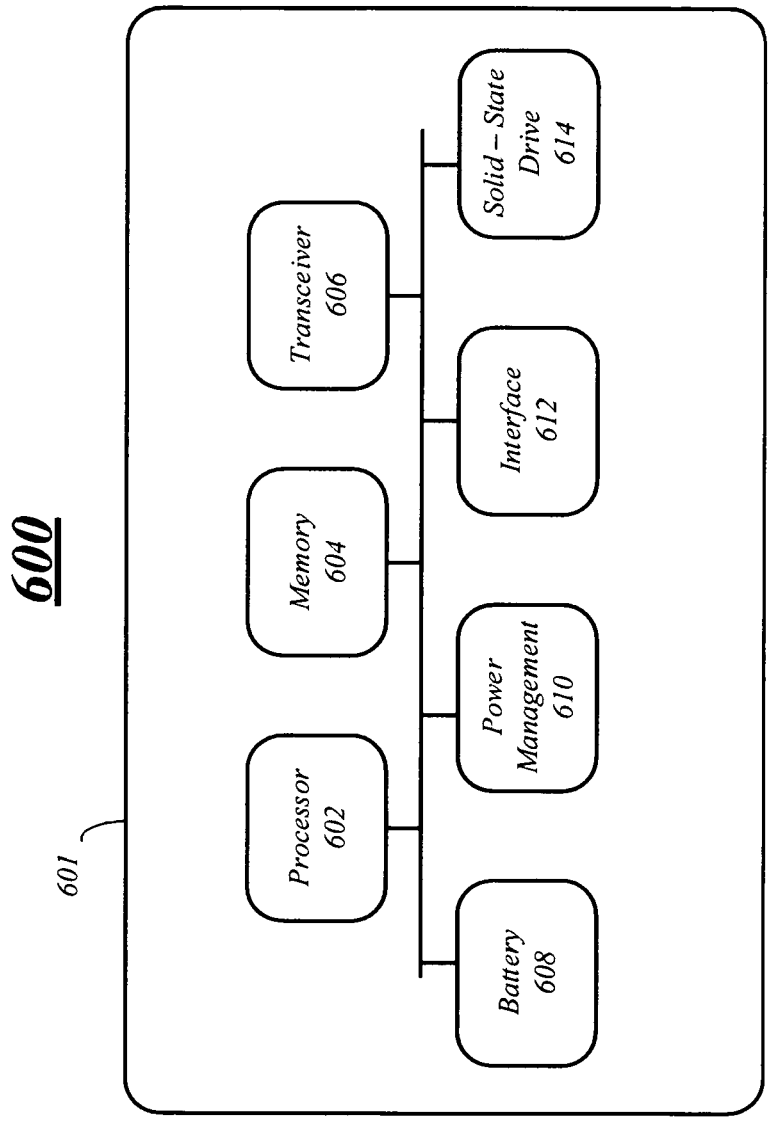
FIG. 6 illustrates an example of a computing system.

FIG. 6 illustrates an example of a computing system 600, which may be any system or device illustrated in FIG. 1A through 4G. In some embodiments, the wireless storage system 105 may at least be partially implemented as system 600. System 600 may include a processor 602, memory 604, a transceiver 606, a battery 608, a power management module 610, an interface 612, and a solid-state drive 614. In various embodiments, the components of system 600 may communicate with each other via one or more interconnects, such as one or more traces, buses and/or control lines.

In some embodiments, the system 600 may be stored within a housing 601 having a small form factor. The housing 601 may be made out of a material such as metal, plastic, and so forth. In some instances, the housing 601 may be small form factor such that a person could easily carry the system 600. For example, the housing 601 have approximate dimensions such as 4.8" W×3.4" L×1" D. Embodiments are not limited to these dimensions and other dimensions may be contemplated and still be considered a small form factor. In some embodiments, the housing 601 may include thermal reducing elements, such as heat sinks and so forth such that the housing 601 does not reach a temperature harmful to a person and/or the device itself. In some embodiments, the housing 601 may include one or more apertures or non-conductive 'windows' to enable wireless communication of data via one or more antennas.

The system may include the processor 602 which may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, system 600 may include more than one processor.

In one embodiment, system 600 may include a memory 604 to couple to processor 602. Memory 604 may be coupled to processor 602 via an interconnect, or by a dedicated communications bus between processor 602 and memory 604, which may vary as desired for a given implementation. Memory unit 604 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory 604 may store data momentarily, temporarily, or permanently. The memory 604 may store instructions and data for system 600. The memory 604 may also store temporary variables or other intermediate information while the processor 602 is executing instructions. The memory 604 is not limited to storing the above discussed data; the memory 604 may store any type of data.

In some embodiments, the system 600 includes a transceiver 606 which includes one or more components and circuitry to transmit and receive information using radio-frequency signals. More specifically, the transceiver 606 may include circuitry to produce radio-frequency mobile radio signals which are to be sent and for processing radio-frequency mobile radio signals which have been received. To this end, the transceiver 606 may be coupled to one or more antennas (not shown). The transmitted or received mobile radio signals are in one or more particular frequency ranges, which are typically prescribed by the mobile radio standard(s) supported by the radio-frequency assemblies. The transceiver 606 can include circuitry to process information according to one or more IEEE standards, one or more peer-to-peer protocols, and so forth. For example, the transceiver 606 may be capable of communicate data in the 60 GHz frequency range in accordance with the IEEE 802.11ad standard.

The system 600 may also include a battery 608 which may be any type of power supply. More specifically, the battery 608 may be a device having two or more electrochemical cells that convert stored chemical energy into electrical energy. The battery may include a Zinc-Carbon battery, a Zinc-chloride battery, an Alkaline battery, a Nickel oxyhydroxide battery, a Lithium battery, a Lithium ion battery, a NiCd battery, a Lead-acid battery, a NiMH battery, a NiZn battery, a AgZn battery, and so forth. Embodiments are not limited to these examples. Other battery types may be utilize phase change materials to store thermal energy which may be converted to electrical energy.

In some embodiments, the system 600 may include a power management module 610 which may control power settings. The power management module 610 may be implemented in software only, hardware only, or a combination of software and hardware. The power management module 610 may put the system 600 into a lower power state when a wireless connection has not been established, data is not being transferred, the system 600 is not coupled with another device, and so forth. Putting the system 600 into a lower power state may enable a longer battery life for the battery 608, for example. Alternatively, if the system 600 is transferring data, a wireless connection has been established, the system 600 is coupled with another device, the system 600 may be put into a higher power state.

In some embodiments, the system 600 may be put into a lower power state and the power management module 610 may cause the system 600 to exit to the lower power state to determine whether a wireless connection can be established with another device. If not, the power management module 610 may cause the system 600 to re-enter the lower power state. The power management module 610 may cause the detection attempt on a periodic or semi-periodic basis. Embodiments are not limited in this manner.

The system 600 also includes an interface 612, which may be the same as interface 160 discussed above. For example, interface 612 may be any device having circuitry for processing information and to enable communicating over one or more buses, traces, connectors, data paths, bridges, and so forth. For example, the interface 612 may include a Universal Serial Bus (USB) port or a PCIe port coupled with a device, such as a persistent storage device, such as the solid-state drive (SSD) 614.

The SSD 614 is a solid-state storage device that uses integrated circuit assemblies as memory to store data persistently. The SSD 614 may use electronic interfaces compatible with traditional block input/output (I/O) hard disk drives, which permit simple replacements in common applications. In some embodiments, the SSD 614 may utilize interfaces, such as a USB interface and a PCIe interface, as previously discussed above. In embodiments, the SSD 614 may have no moving (mechanical) components. In some instances, the SSD 614 performs read/write operations faster than a mechanical hard drive. Thus, the SSD 614 may be particular suited in a wireless storage system to enable fast read/write operations to wireless communicate data. Embodiments are not limited in this manner.

Figure 7:
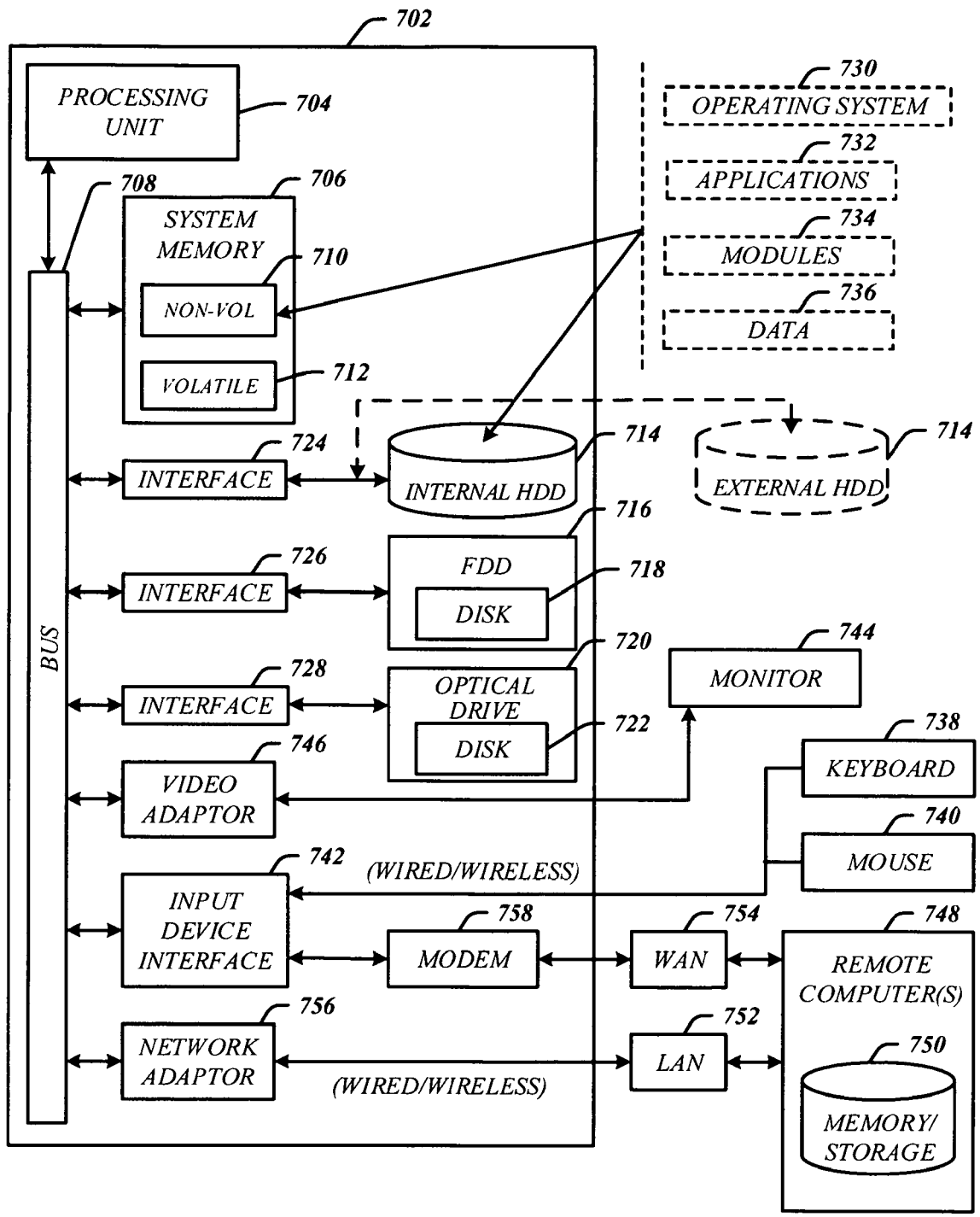
FIG. 7 illustrates an example of a computer architecture.

FIG. 7 illustrates an embodiment of an exemplary computing architecture 700 suitable for implementing various embodiments as previously described. In one embodiment, the computing architecture 700 may include or be implemented as part of computing system, such as systems 105, 110, and 115.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the systems as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, apparatus may include a bus interface to operate in accordance with a bus protocol; a persistent storage device coupled with the bus interface via a bus; a processing unit coupled with the bus interface and the persistent storage, the processing unit to utilize a protocol adaption layer (PAL) extension based on the bus protocol to enable a wireless transfer of data between the persistent storage device and a remote device; and a transceiver coupled with the bus interface, persistent storage, and the processing unit, the transceiver to communicate the data as radio-frequency (RF) signals between the persistent storage device and the remote device utilizing the PAL extension.

In a second example and in furtherance of the first example, a system, device, apparatus may include the bus interface comprising a universal serial bus (USB) interface and enabled to operate in accordance with the bus protocol comprising a USB protocol, and the processing unit to utilize the PAL extension comprising a wireless serial extension (WSE) to enable the wireless transfer of the data.

In a third example and in furtherance of any previous example, a system, device, apparatus may include the bus interface comprising a peripheral component interconnect express (PCIe) interface and enabled to operate in accordance with the bus protocol comprising a PCIe protocol, and the processing unit to utilize the PAL extension comprising a wireless bus extension (WBE) to enable the wireless transfer of the data.

In a fourth example and in furtherance of any previous example, a system, device, apparatus may include a bridge to convert a peripheral component interconnect express (PCIe) bus coupled with the persistent storage device to a universal serial bus (USB) coupled with the interface comprising a USB interface and the processing unit to utilize a wireless bus extension (WBE) to enable the wireless transfer of the data.

In a fifth example and in furtherance of any previous example, a system, device, apparatus may include a system on chip (SoC) comprising the processing unit, the transceiver, the bus interface, a battery, and a volatile memory, the SoC coupled with the persistent storage device via the bus interface and the bus comprising at least one of a universal serial bus (USB) and a peripheral component interconnect express (PCIe) bus.

In a sixth example and in furtherance of any previous example, a system, device, apparatus may include the processing unit to communicate, via the transceiver, the data comprising media data between the persistent storage device and the remote device comprising a virtual reality helmet.

In a seventh example and in furtherance of any previous example, a system, device, apparatus may include the processing unit to communicate, via the transceiver, the data comprising media data between the persistent storage device and the remote device comprising an infotainment system.

In an eighth example and in furtherance of any previous example, a system, device, apparatus may include the processing unit to communicate, via the transceiver, the data comprising media data between the persistent storage device and the remote device comprising a kiosk system.

In a ninth example and in furtherance of any previous example, a system, device, apparatus may include the processing unit to communicate, via the transceiver, the data between the persistent storage device and the remote device comprising a compute stick.

In a tenth example and in furtherance of any previous example, a system, device, apparatus may include the processing unit to communicate, via the transceiver, the data comprising media data between the persistent storage device and the remote device comprising a medical imaging device.

In a eleventh example and in furtherance of any previous example, a system, device, apparatus may include the processing unit to communicate, via the transceiver, the data comprising media data between the persistent storage device and the remote device comprising a display device.

In a twelfth example and in furtherance of any previous example, a system, device, apparatus may include a graphics processing unit (GPU) coupled with the processing unit and the transceiver via the interface, and the processing unit to communicate, via the transceiver, compute instructions between the GPU and the remote device, the GPU to process the compute instructions and return results to the remote device.

In a thirteenth example and in furtherance of any previous example, a method may include utilizing, by a processing unit, a protocol adaption layer (PAL) extension based on the bus protocol to enable a wireless transfer of data between a persistent storage device and a remote device; and communicating, via a transceiver, the data as radio-frequency (RF) signals between the persistent storage device and the remote device utilizing the PAL extension.

In a fourteenth example and in furtherance of any previous example, a method may include communicating, via the transceiver, the data comprising media data between the persistent storage device and the remote device comprising a virtual reality helmet.

In a fifteenth example and in furtherance of any previous example, a method may include communicating, via the transceiver, the data comprising media data between the persistent storage device and the remote device comprising an infotainment system.

In a sixteenth example and in furtherance of any previous example, a method may include communicating, via the transceiver, the data comprising media data between the persistent storage device and the remote device comprising a kiosk system.

In a seventeenth example and in furtherance of any previous example, a method may include communicating, via the transceiver, the data between the persistent storage device and the remote device comprising a compute stick.

In a eighteenth example and in furtherance of any previous example, a method may include communicating, via the transceiver, the data comprising media data between the persistent storage device and the remote device comprising a medical imaging device.

In a nineteenth example and in furtherance of any previous example, a method may include communicating, via a transceiver, the data comprising media data between the persistent storage device and the remote device comprising a display device.

In a twentieth example and in furtherance of any previous example, a method may include communicating, via the transceiver, compute instructions between a graphics processing unit (GPU) and the remote device, the GPU to process the compute instructions and return results to the remote device.

In a twenty-first example and in furtherance of any previous example, a computer-readable storage medium comprising a plurality of instructions that, when executed by processing circuitry, enable the processing circuitry to utilize a protocol adaption layer (PAL) extension based on the bus protocol to enable a wireless transfer of data between a persistent storage device and a remote device and communicate, via a transceiver, the data as radio-frequency (RF) signals between the persistent storage device and the remote device utilizing the PAL extension.

In a twenty-second example and in furtherance of any previous example, a computer-readable storage medium comprising a plurality of instructions that, when executed by processing circuitry, enable the processing circuitry to communicate, via a transceiver, the data comprising media data between the persistent storage device and the remote device comprising a virtual reality helmet.

In a twenty-third example and in furtherance of any previous example, a computer-readable storage medium comprising a plurality of instructions that, when executed by processing circuitry, enable the processing circuitry to communicate, via a transceiver, the data comprising media data between the persistent storage device and the remote device comprising an infotainment system.

In a twenty-fourth example and in furtherance of any previous example, a computer-readable storage medium comprising a plurality of instructions that, when executed by processing circuitry, enable the processing circuitry to communicate, via a transceiver, the data comprising media data between the persistent storage device and the remote device comprising a kiosk system.

In a twenty-fifth example and in furtherance of any previous example, a computer-readable storage medium comprising a plurality of instructions that, when executed by processing circuitry, enable the processing circuitry to communicate, via a transceiver, the data comprising media data between the persistent storage device and the remote device comprising a display device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A portable wireless storage apparatus, comprising:
   a bus interface to operate in accordance with a bus protocol;
   a persistent storage device coupled with the bus interface via a bus, the persistent storage device comprising solid-state memory circuitry;
   a processing unit coupled with the bus interface and the persistent storage, the processing unit to utilize a protocol adaption layer (PAL) extension based on the bus protocol to enable a wireless transfer of data between the persistent storage device and a remote device; and
   a transceiver coupled with the bus interface, persistent storage, and the processing unit, the transceiver to communicate the data as radio-frequency (RF) signals between the persistent storage device and the remote device utilizing the PAL extension, wherein the data is communicated at speeds of approximately 7 Gigabits/second using a multi-carrier mode and 4.6 Gigabits/second using a single carrier mode and the data is communicated via the 60 GHz frequency band.

2. The apparatus of claim 1, the bus interface comprising a universal serial bus (USB) interface and enabled to operate in accordance with the bus protocol comprising a USB protocol, and
   the processing unit to utilize the PAL extension comprising a wireless serial extension (WSE) to enable the wireless transfer of the data.

3. The apparatus of claim 1, the bus interface comprising a peripheral component interconnect express (PCIe) interface and enabled to operate in accordance with the bus protocol comprising a PCIe protocol, and
   the processing unit to utilize the PAL extension comprising a wireless bus extension (WBE) to enable the wireless transfer of the data.

4. The apparatus of claim 1, comprising:
   a bridge to convert a peripheral component interconnect express (PCIe) bus coupled with the persistent storage device to a universal serial bus (USB) coupled with the interface comprising a USB interface and the processing unit to utilize a wireless bus extension (WBE) to enable the wireless transfer of the data.

5. The apparatus of claim 1, comprising:
   a system on chip (SoC) comprising the processing unit, the transceiver, the bus interface, a battery, and a volatile memory, the SoC coupled with the persistent storage device via the bus interface and the bus comprising at least one of a universal serial bus (USB) and a peripheral component interconnect express (PCIe) bus.

6. The apparatus of claim 1, the processing unit to communicate, via the transceiver, the data comprising media data between the persistent storage device and the remote device comprising a virtual reality helmet.

7. The apparatus of claim 1, the processing unit to communicate, via the transceiver, the data comprising media data between the persistent storage device and the remote device comprising an infotainment system.

8. The apparatus of claim 1, the processing unit to communicate, via the transceiver, the data comprising media data between the persistent storage device and the remote device comprising a kiosk system.

9. The apparatus of claim 1, the processing unit to communicate, via the transceiver, the data between the persistent storage device and the remote device comprising a compute stick.

10. The apparatus of claim 1, the processing unit to communicate, via the transceiver, the data comprising media data between the persistent storage device and the remote device comprising a medical imaging device.

11. The apparatus of claim 1, the processing unit to communicate, via the transceiver, the data comprising media data between the persistent storage device and the remote device comprising a display device.

12. The apparatus of claim 1, comprising:
a graphics processing unit (GPU) coupled with the processing unit and the transceiver via the interface, and
the processing unit to communicate, via the transceiver, compute instructions between the GPU and the remote device, the GPU to process the compute instructions and return results of processing of the compute instructions to the remote device.

13. A computer-implemented method, comprising:
utilizing, by a processing unit of a wireless portable persistent storage device a protocol adaption layer (PAL) extension based on a bus protocol to enable a wireless transfer of data between the wireless portable persistent storage device and a remote device, the wireless portable persistent storage device comprising solid-state memory circuitry coupled to the processing unit via a bus operating in accordance with the bus protocol; and
communicating, via a transceiver of the wireless portable persistent storage device, the data as radio-frequency (RF) signals between the persistent storage device and the remote device utilizing the PAL extension, wherein the data is communicated at speeds of approximately 7 Gigabits/second using a multi-carrier mode and 4.6 Gigabits/second using a single carrier mode and the data is communicated via the 60 GHz frequency band.

14. The computer-implemented method of claim 13, comprising:
communicating, via the transceiver, the data comprising media data between the persistent storage device and the remote device comprising a virtual reality helmet.

15. The computer-implemented method of claim 13, comprising:
communicating, via the transceiver, the data comprising media data between the persistent storage device and the remote device comprising an infotainment system.

16. The computer-implemented method of claim 13, comprising:
communicating, via the transceiver, the data comprising media data between the persistent storage device and the remote device comprising a kiosk system.

17. The computer-implemented method of claim 13, comprising:
communicating, via the transceiver, the data between the persistent storage device and the remote device comprising a compute stick.

18. The computer-implemented method of claim 13, comprising:
communicating, via the transceiver, the data comprising media data between the persistent storage device and the remote device comprising a medical imaging device.

19. The computer-implemented method of claim 13, comprising:
communicating, via a transceiver, the data comprising media data between the persistent storage device and the remote device comprising a display device.

20. The computer-implemented method of claim 13, comprising:
communicating, via the transceiver, compute instructions between a graphics processing unit (GPU) and the remote device, the GPU to process the compute instructions and return results of processing of the compute instructions to the remote device.

21. A non-transitory computer-readable storage medium comprising a plurality of instructions that, when executed by processing circuitry of a wireless portable persistent storage device, enable the processing circuitry to:
utilize a protocol adaption layer (PAL) extension based on a bus protocol to enable a wireless transfer of data between the wireless portable persistent storage device and a remote device, the wireless portable persistent storage device comprising solid-state memory circuitry coupled to the processing unit via a bus operating in accordance with the bus protocol; and
communicate, via a transceiver of the wireless portable persistent storage device, the data as radio-frequency (RF) signals between the persistent storage device and the remote device utilizing the PAL extension, wherein the data is communicated at speeds of approximately 7 Gigabits/second using a multi-carrier mode and 4.6 Gigabits/second using a single carrier mode and the data is communicated via the 60 GHz frequency band.

22. The non-transitory computer-readable storage medium of claim 21, comprising a plurality of instructions, that when executed, enable processing circuitry to:
communicate, via a transceiver, the data comprising media data between the persistent storage device and the remote device comprising a virtual reality helmet.

23. The non-transitory computer-readable storage medium of claim 21, comprising a plurality of instructions, that when executed, enable processing circuitry to:
communicate, via a transceiver, the data comprising media data between the persistent storage device and the remote device comprising an infotainment system.

24. The non-transitory computer-readable storage medium of claim 21, comprising a plurality of instructions, that when executed, enable processing circuitry to:
communicate, via a transceiver, the data comprising media data between the persistent storage device and the remote device comprising a kiosk system.

25. The non-transitory computer-readable storage medium of claim 21, comprising a plurality of instructions, that when executed, enable processing circuitry to:
communicate, via a transceiver, the data comprising media data between the persistent storage device and the remote device comprising a display device.

* * * * *